(12) United States Patent
Kim et al.

(10) Patent No.: US 12,034,220 B2
(45) Date of Patent: Jul. 9, 2024

(54) ANTENNA DEVICE

(71) Applicant: KMW INC., Hwaseong-si (KR)

(72) Inventors: In Ho Kim, Yongin-si (KR); Seong Man Kang, Hwaseong-si (KR); Hyoung Seok Yang, Hwaseong-si (KR); Yong Hee Han, Osan-si (KR); Young Ji Hong, Daejeon (KR); Dae Myung Park, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 67 days.

(21) Appl. No.: 17/882,515

(22) Filed: Aug. 5, 2022

(65) Prior Publication Data
US 2022/0384946 A1 Dec. 1, 2022

Related U.S. Application Data

(63) Continuation of application No. PCT/KR2021/001578, filed on Feb. 5, 2021.

(30) Foreign Application Priority Data

Feb. 7, 2020 (KR) .................. 10-2020-0015233
Feb. 5, 2021 (KR) .................. 10-2021-0016822

(51) Int. Cl.
*H01Q 1/24* (2006.01)
*F16H 1/16* (2006.01)
(Continued)

(52) U.S. Cl.
CPC .............. *H01Q 3/08* (2013.01); *F16H 1/16* (2013.01); *H01Q 9/34* (2013.01)

(58) Field of Classification Search
CPC .. H01Q 3/08; H01Q 9/34; H01Q 3/06; H01Q 1/246; H01Q 1/1264; F16H 1/16
See application file for complete search history.

(56) References Cited

U.S. PATENT DOCUMENTS 5,642,123 A * 6/1997 Shinkawa .............. H01Q 1/103
343/903
2011/0168855 A1 7/2011 Bonczyk et al.
(Continued)

FOREIGN PATENT DOCUMENTS

CN 104901013 A 9/2015
CN 106252884 A 12/2016
(Continued)

OTHER PUBLICATIONS

Non-final Office Action dated Aug. 15, 2023 from the Japanese Patent Office for Japanese Application No. 2022-546474.
(Continued)

*Primary Examiner* — David E Lotter
(74) *Attorney, Agent, or Firm* — Insight Law Group, PLLC; Seung Lee

(57) ABSTRACT

Provided is an antenna device capable of ensuring an installation space for components related to an antenna and eliminating a dead zone of a signal transmitted or received by the antenna by tilting an antenna unit. To this end, the antenna device according to the present invention includes a pole, an antenna unit, a lower link unit configured to couple a lower portion of the antenna unit to the pole so that the lower portion of the antenna unit is rotatable in an upward/downward direction, and a tilt drive unit configured to couple an upper portion of the antenna unit to the pole and tilt the upper portion of the antenna unit by rotating the upper portion of the antenna unit about a rotation center of the lower link unit, in which the tilt drive unit includes a tilt motor, a worm gear configured to be rotated by driving power of the tilt motor, a first tilt arm coupled to the antenna unit, a second tilt arm coupled to the pole, a first worm wheel configured to rotate the first tilt arm by being rotated by a rotation of the worm gear, and a second worm wheel (Continued)

configured to rotate the second tilt arm by being rotated by a rotation of the worm gear.

22 Claims, 19 Drawing Sheets

(51) Int. Cl.
*H01Q 3/08* (2006.01)
*H01Q 9/34* (2006.01)

(56) References Cited

U.S. PATENT DOCUMENTS

2018/0083358 A1   3/2018   Wang et al.
2018/0159199 A1*  6/2018   Kolokotronis ......... H01Q 1/246
2020/0194884 A1*  6/2020   Clifford ................. H01Q 1/125

FOREIGN PATENT DOCUMENTS

| CN | 207852901 U | 9/2018 |
| JP | 2005-051409 A | 2/2005 |
| KR | 10-1996-0009270 A | 3/1996 |
| WO | 2018-013602 A2 | 1/2018 |
| WO | 2018/049838 A1 | 3/2018 |

OTHER PUBLICATIONS

International Search Report dated May 17, 2021 for International Application No. PCT/KR2021/001578 and its English translation.
Non-final Office Action mailed on Dec. 19, 2023 from the Indian Patent Office for Indian Application No. 202217046513.
Extended European Search Report mailed on May 13, 2024 from the European Patent Office for European Application No. 21750091.7.

\* cited by examiner (a)

(b)

ANTENNA DEVICE

CROSS-REFERENCE TO RELATED APPLICATIONS

This application is a continuation application of International Application No. PCT/KR2021/001578, filed Feb. 5, 2021, which claims the benefit of Korean Patent Application Nos. 10-2020-0015233, filed Feb. 7, 2020; and 10-2021-0016822, filed Feb. 5, 2021, in the Korean Intellectual Property Office, the disclosures of which are incorporated herein in their entirety by reference.

TECHNICAL FIELD

The present invention relates to an antenna device, and more particularly, to a multiple-input/multiple-output antenna device used for a wireless communication technology such as a mobile communication terminal.

BACKGROUND ART

In general, as an example of wireless communication technologies, a multiple-input/multiple-output (MIMO) technology refers to a technology for innovatively increasing data transmission capacity by using a plurality of antennas. This technology uses a spatial multiplexing technique, in which a transmitter transmits different data through the respective transmission antennas, and a receiver distinguishes the transmitted data by performing appropriate signal processing.

Therefore, it is possible to transmit a larger amount of data by increasing both the number of transmitting antennas and the number of receiving antennas and thus increasing channel capacities. For example, if the number of antennas increases to ten, the channel capacity of about 10 times is ensured by using the same frequency band in comparison with the current single antenna system.

Eight antennas are used in 4G LTE-advanced, and a product equipped with 64 or 128 antennas has been developed in a current pre-5G step. It is expected that base station equipment having a much larger number of antennas will be used in 5G, which refers to a massive MIMO technology. The current cell management is 2-dimension, whereas 3D-beam forming is enabled when the massive MIMO technology is introduced, which also represents a full-dimension (FD) MIMO.

In the massive MIMO technology, the number of transmitters and the number of filters are also increased as the number of antennas (ANTs) is increased. Nevertheless, to maximize the ease of installation or spatial utilization when a MIMO antenna in which RF components (antennas, filters, power amplifiers, transceivers, etc.) and digital components are coupled in a layered structure is installed in a limited space, there is an emerging need to make a plurality of layers, constituting the MIMO antenna, compact and small in size because of cost of lease or spatial restriction in an installation location.

In addition, the intensity of communication with a mobile communication terminal may vary depending on a direction in which the antenna is directed. Therefore, in the case of an antenna for a base station, it is necessary to change a direction of a signal, which is transmitted or received by the antenna, by tilting the antenna in order to eliminate a dead zone.

DISCLOSURE

Technical Problem

A technical object of the present invention is to provide an antenna device capable of ensuring an installation space for components related to an antenna and eliminating a dead zone of a signal transmitted or received by the antenna by tilting an antenna unit.

The technical problems of the present invention are not limited to the aforementioned technical problem, and other technical problems, which are not mentioned above, may be clearly understood by those skilled in the art from the following descriptions.

Technical Solution

To achieve the object, an antenna device according to the present invention includes a pole, an antenna unit, a lower link unit, and a tilt drive unit. The lower link unit couples a lower portion of the antenna unit to the pole so that the lower portion of the antenna unit is rotatable in an upward/downward direction. The tilt drive unit couples an upper portion of the antenna unit to the pole. The tilt drive unit tilts the upper portion of the antenna unit by rotating the upper portion of the antenna unit about a rotation center of the lower link unit. The tilt drive unit includes a tilt motor, a worm gear, a first tilt arm, a second tilt arm, a first worm wheel, and a second worm wheel. The worm gear is rotated by driving power of the tilt motor. The first tilt arm is coupled to the antenna unit. The second tilt arm is coupled to the pole. The first worm wheel rotates the first tilt arm by being rotated by a rotation of the worm gear. The second worm wheel rotates the second tilt arm by being rotated by a rotation of the worm gear.

A radio unit may be coupled to the antenna unit. The radio unit may be disposed in an internal space defined by the pole, the antenna unit, the lower link unit, and the tilt drive unit.

The antenna device according to the present invention may further include an upper mounting bracket and an upper mounting clamp. The upper mounting bracket may be coupled to the upper portion of the antenna unit. The upper mounting bracket may have first coupling portions protruding toward the pole. The upper mounting clamp may be coupled to an upper portion of the pole. The upper mounting clamp may have second coupling portions protruding toward the antenna unit. A lower portion of the first tilt arm may be rotatably coupled to the first coupling portions. An upper portion of the first tilt arm may be coupled to rotary shafts of the first worm wheel. A lower portion of the second tilt arm may be rotatably coupled to the second coupling portions. An upper portion of the second tilt arm may be coupled to rotary shafts of the second worm wheel.

The first coupling portions may be provided as a pair of first coupling portions spaced apart from each another in a transverse direction of the antenna unit. The second coupling portions may be provided as a pair of second coupling portions spaced apart from each another in the transverse direction of the antenna unit. The first tilt arm may include a first tilt arm main body, a first extension portion, and a second extension portion. The first tilt arm main body may have two opposite lower portions rotatably coupled to the pair of first coupling portions. The first extension portion may extend upward from one side upper end of the first tilt arm main body. The first extension portion may be coupled to one end of the rotary shaft of the first worm wheel. The second extension portion may extend upward from the other side upper end of the second tilt arm main body. The second extension portion may be coupled to the other end of the rotary shaft of the first worm wheel. The second tilt arm may include a second tilt arm main body, a third extension portion, and a fourth extension portion. The second tilt arm main body may have two opposite lower portions rotatably coupled to the pair of second coupling portions. The third extension portion may extend upward from one side upper end of the second tilt arm main body. The third extension portion may be coupled to one end of the rotary shaft of the second worm wheel. The fourth extension portion may extend upward from the other side upper end of the second tilt arm main body. The fourth extension portion may be coupled to the other end of the rotary shaft of the second worm wheel.

The antenna device according to the present invention may further include tilt drive housings. The tilt drive housings may be disposed between the first extension portion and the third extension portion and between the second extension portion and the fourth extension portion. The tilt drive housings may accommodate the tilt motor, the worm gear, the first worm wheel, and the second worm wheel therein.

One of the first extension portion and the second extension portion may be separably fastened to the first tilt arm main body. One of the third extension portion and the fourth extension portion may be separably fastened to the second tilt arm main body.

The rotary shafts of the first worm wheel may include a first rotary shaft portion and a second rotary shaft portion. The first rotary shaft portion may have an outer periphery to which the first worm wheel is coupled. The first rotary shaft portion may have an outer end fastened to any one of the first extension portion and the second extension portion. The second rotary shaft portion may be integrated with the other of the first extension portion and the second extension portion. The second rotary shaft portion may be fastened to an inner end of the first rotary shaft portion. The rotary shafts of the second worm wheel may include a third rotary shaft portion and a fourth rotary shaft portion. The third rotary shaft portion may have an outer periphery to which the second worm wheel is coupled. The third rotary shaft portion may have an outer end fastened to any one of the third extension portion and the fourth extension portion. The fourth rotary shaft portion may be integrated with the other of the third extension portion and the fourth extension portion. The fourth rotary shaft portion may be fastened to an inner end of the third rotary shaft portion.

A first catching protrusion extending to a center from the outside may be formed on any one of a facing surface of the inner end of the first rotary shaft portion and a facing surface of an inner end of the second rotary shaft portion. A first catching groove extending to the center from the outside may be formed in the other of the facing surface of the inner end of the first rotary shaft portion and the facing surface of the inner end of the second rotary shaft portion. The first catching protrusion may be inserted into the first catching groove. A second catching protrusion extending to the center from the outside may be formed on any one of a facing surface of the inner end of the third rotary shaft portion and a facing surface of an inner end of the fourth rotary shaft portion. A second catching groove extending to the center from the outside may be formed in the other of the facing surface of the inner end of the third rotary shaft portion and the facing surface of the inner end of the fourth rotary shaft portion. The second catching protrusion may be inserted into the second catching groove.

First stoppers may respectively protrude from the facing surfaces of the first and second tilt arm main bodies. The first stoppers may come into contact with each other when the antenna unit is minimally tilted.

A second stopper may protrude from the tilt drive housing. The second stopper may come into contact with at least one of the first extension portion and the second extension portion when the antenna unit is maximally tilted. The second stopper may come into contact with at least one of the third extension portion and the fourth extension portion when the antenna unit is maximally tilted.

Internal open spaces may be respectively formed in an upper portion of the first tilt arm main body and an upper portion of the second tilt arm main body. The internal open spaces may be formed so that facing sides of the first and second tilt arm main bodies are opened.

First opening holes may be respectively formed in a lower portion of the first tilt arm main body and a lower portion of the second tilt arm main body. The first opening holes may be formed through from the antenna unit to the pole.

Second opening holes may be further respectively formed at a lower side of the first tilt arm main body and a lower side of the second tilt arm main body. The second opening holes may communicate with the first opening holes.

The lower link unit may include a lower mounting bracket and a lower mounting clamp. The lower mounting bracket may be coupled to the lower portion of the antenna unit. The lower mounting bracket may have third coupling portions protruding toward the pole. The lower mounting clamp may be coupled to a lower portion of the pole. The lower mounting clamp may have fourth coupling portions protruding toward the antenna unit. The third coupling portions and the fourth coupling portions may be coupled to one another and configured to be rotatable in an upward/downward direction, such that the lower link unit may be coupled to be rotatable in the upward/downward direction.

The third coupling portions may be provided as a pair of third coupling portions spaced apart from each other in a transverse direction of the antenna unit. The fourth coupling portions may be provided as a pair of fourth coupling portions spaced apart from each other in the transverse direction of the antenna unit.

The worm gear may be disposed between the first worm wheel and the second worm wheel. The worm gear may adjust a clearance between the worm gear and the first worm wheel and a clearance between the worm gear and the second worm wheel by rotating in a circumferential direction of the first and second worm wheels.

A speed reducer may be further accommodated in the tilt drive housing. The speed reducer may amplify output torque of the tilt motor and transmit the amplified output torque to the worm gear. The worm gear may protrude from the speed reducer. The speed reducer may be installed in the tilt drive housing and configured to be rotatable in the circumferential direction of the first and second worm wheels, such that the worm gear may be rotatable in the circumferential direction of the first and second worm wheels.

The first coupling portions of the upper mounting bracket may be coupled to the first tilt arm and configured to be rotatable in the upward/downward direction. The second coupling portions of the upper mounting clamp may be coupled to the second tilt arm and configured to be rotatable in the upward/downward direction. The antenna device according to the present invention may further include a steering unit and a clutch unit. The steering unit may be coupled to the pole. The steering unit may rotate the upper mounting clamp in a horizontal direction. The clutch unit may be coupled to the pole and fix the lower mounting clamp. When the steering unit rotates the upper mounting clamp in the horizontal direction, the clutch unit may be decoupled from the pole, and the clutch unit may be rotatable in the horizontal direction.

An upper portion of the first tilt arm may be rotatably coupled to the first coupling portions. A lower portion of the first tilt arm may be coupled to the rotary shafts of the first worm wheel. An upper portion of the second tilt arm may be rotatably coupled to the second coupling portions. A lower portion of the second tilt arm may be coupled to the rotary shafts of the second worm wheel.

The antenna device according to the present invention may further include: a plurality of shaft end caps. The plurality of shaft end caps may couple the first tilt arm to two opposite ends of the rotary shaft of the first worm wheel by means of bolts. The plurality of shaft end caps may couple the second tilt arm to two opposite ends of the rotary shaft of the second worm wheel by means of bolts. Bolt head accommodation grooves may be respectively formed in the plurality of shaft end caps and accommodate heads of the bolts. The bolt head accommodation grooves may each be filled with a bonding agent that fixes the head of the bolt.

The bolt head accommodation groove and the head of the bolt may each be formed in a polygonal shape.

A threaded portion of the bolt may be fixed to the rotary shaft of the first worm wheel or the rotary shaft of the second worm wheel by means of a screw fixing agent.

Other detailed matters of the embodiment are included in the detailed description and the drawings.

Advantageous Effects

The antenna device according to the present invention may ensure the installation space for the components related to the antenna and eliminate a dead zone of a signal transmitted or received by the antenna by tilting the antenna unit.

In addition, the antenna device according to the present invention may tilt the antenna unit by using the two worm wheels, thereby quickly tilting the antenna unit in comparison with a case in which the antenna unit is tilted by a single worm wheel.

In addition, according to the antenna device according to the present invention, when an external force such as wind is applied to the antenna device from the outside, the external force is dispersed to the two worm wheels.

Therefore, it is possible to improve structural stability of the gear parts in comparison with a case in which the antenna unit is tilted by a single worm wheel.

In addition, the antenna device according to the present invention may include the plurality of shaft end caps configured to couple the first tilt arm to the two opposite ends of the rotary shaft of the first worm wheel by means of the bolts and couple the second tilt arm to the two opposite ends of the rotary shaft of the second worm wheel by means of the bolts. The plurality of shaft end caps may each have the bolt head accommodation groove that accommodates the head of the bolt. The bolt head accommodation groove may be filled with the bonding agent that fixes the head of the bolt. Therefore, the antenna device may eliminate the assembly tolerance between the rotary shaft of the first worm wheel and the rotary shaft of the second worm wheel, and then may fix the horizontal assembling positions of the rotary shaft of the first worm wheel of the rotary shaft of the second worm wheel by means of the bonding agent from the outside of the tilt drive unit. Therefore, the antenna device may keep an operation balance between the first and second tilt arms.

The effects of the present invention are not limited to the aforementioned effects, and other effects, which are not mentioned above, will be clearly understood by those skilled in the art from the claims.

DESCRIPTION OF MAIN REFERENCE NUMERALS OF DRAWINGS

Figure 1:
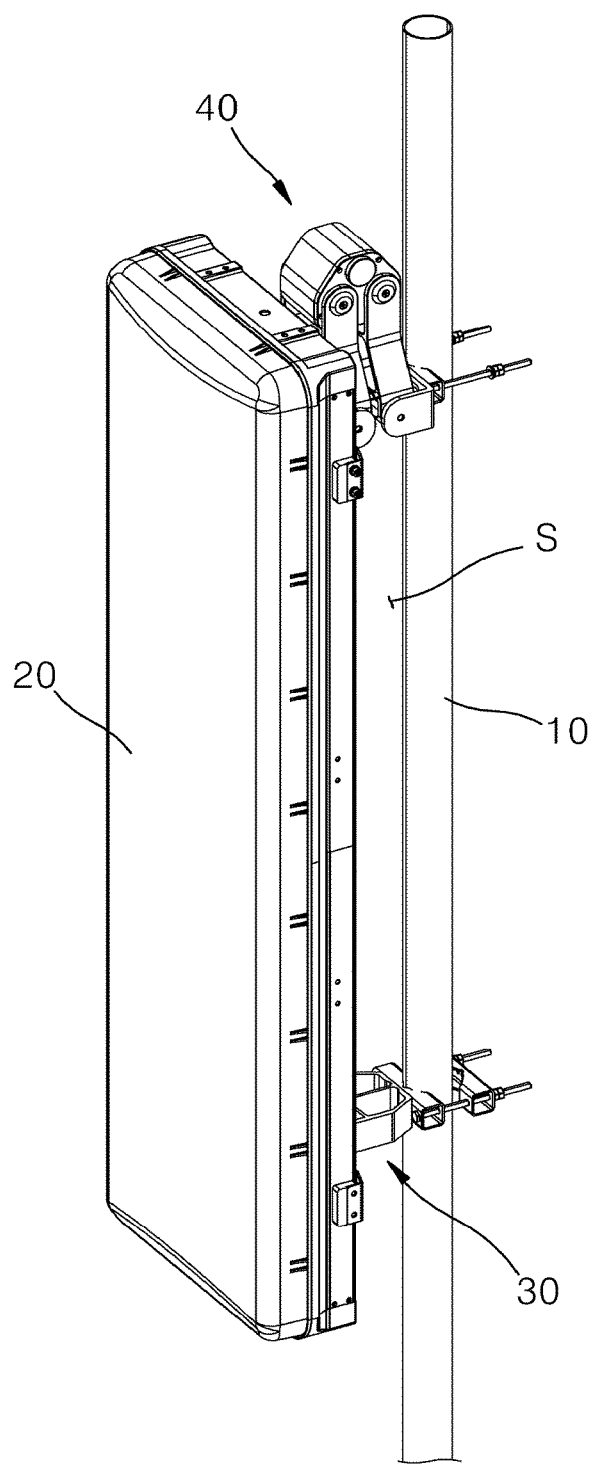
FIG. 1 is a perspective view illustrating an antenna device according to an embodiment of the present invention.

10: Pole
20: Antenna unit
30: Lower link unit
31: Lower mounting bracket
31A: Third coupling portion
32: Lower mounting clamp
32A: Fourth coupling portion
40: Tilt drive unit
50: Radio unit (RU)
60: Upper mounting bracket
60A: First coupling portion
70: Upper mounting clamp
70A: Second coupling portion
410: First tilt arm
411: First tilt arm main body
411B, 421B: First opening hole
411C, 421C: Second opening hole
411D, 421D: Internal open space 411S, 421S: First stopper
412: First extension portion
413: Second extension portion
420: Second tilt arm
421: Second tilt arm main body
422: Third extension portion
423: Fourth extension portion
431, 432: Tilt drive housing
432S: Second stopper
433: Tilt motor
435: Worm gear
436: First worm wheel
436F: First catching groove
436P: First catching protrusion
436S1, 436S2: Rotary shaft of first worm wheel
437: Second worm wheel
437F: Second catching groove
437P: Second catching protrusion
437S1, 437S2: Rotary shaft of second worm wheel
440: Shaft end cap
443: Bolt head accommodation groove
450: Bolt
470: Bonding agent

BEST MODE

Hereinafter, an antenna device according to embodiments of the present invention will be described with reference to the drawings.

Figure 2:
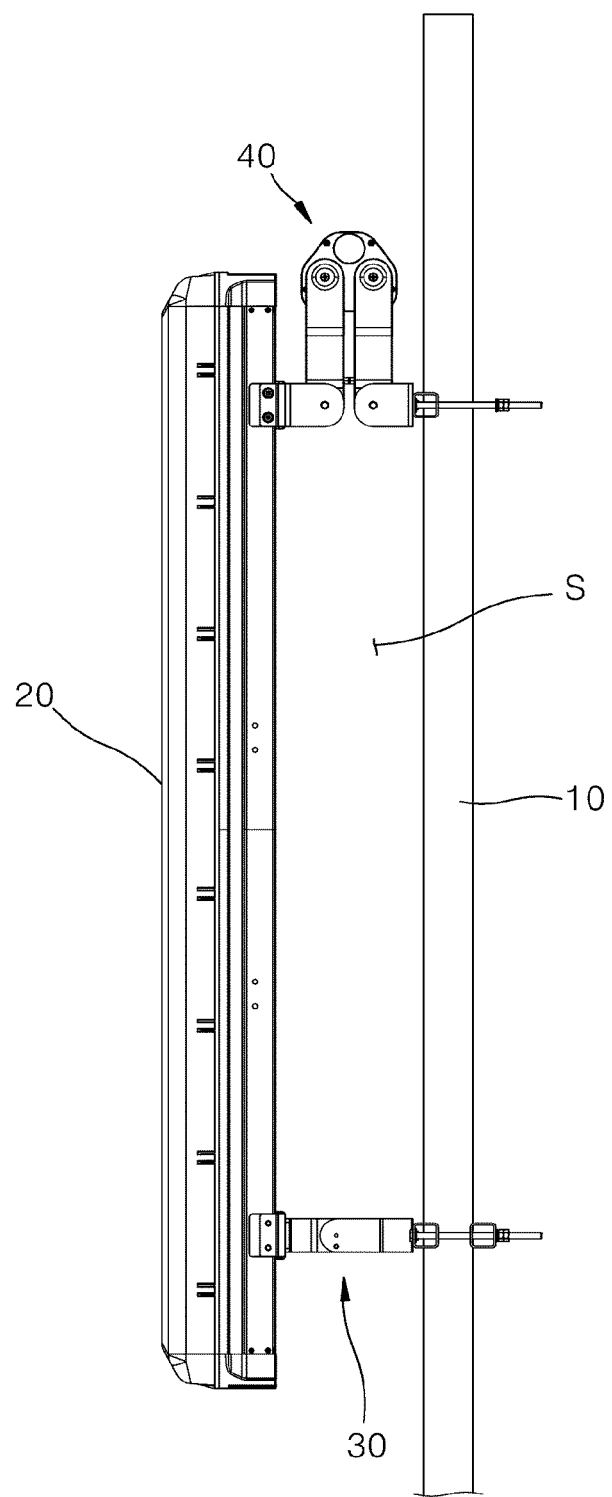
FIG. 2 is a side view illustrating the antenna device according to the embodiment of the present invention.
Figure 3:
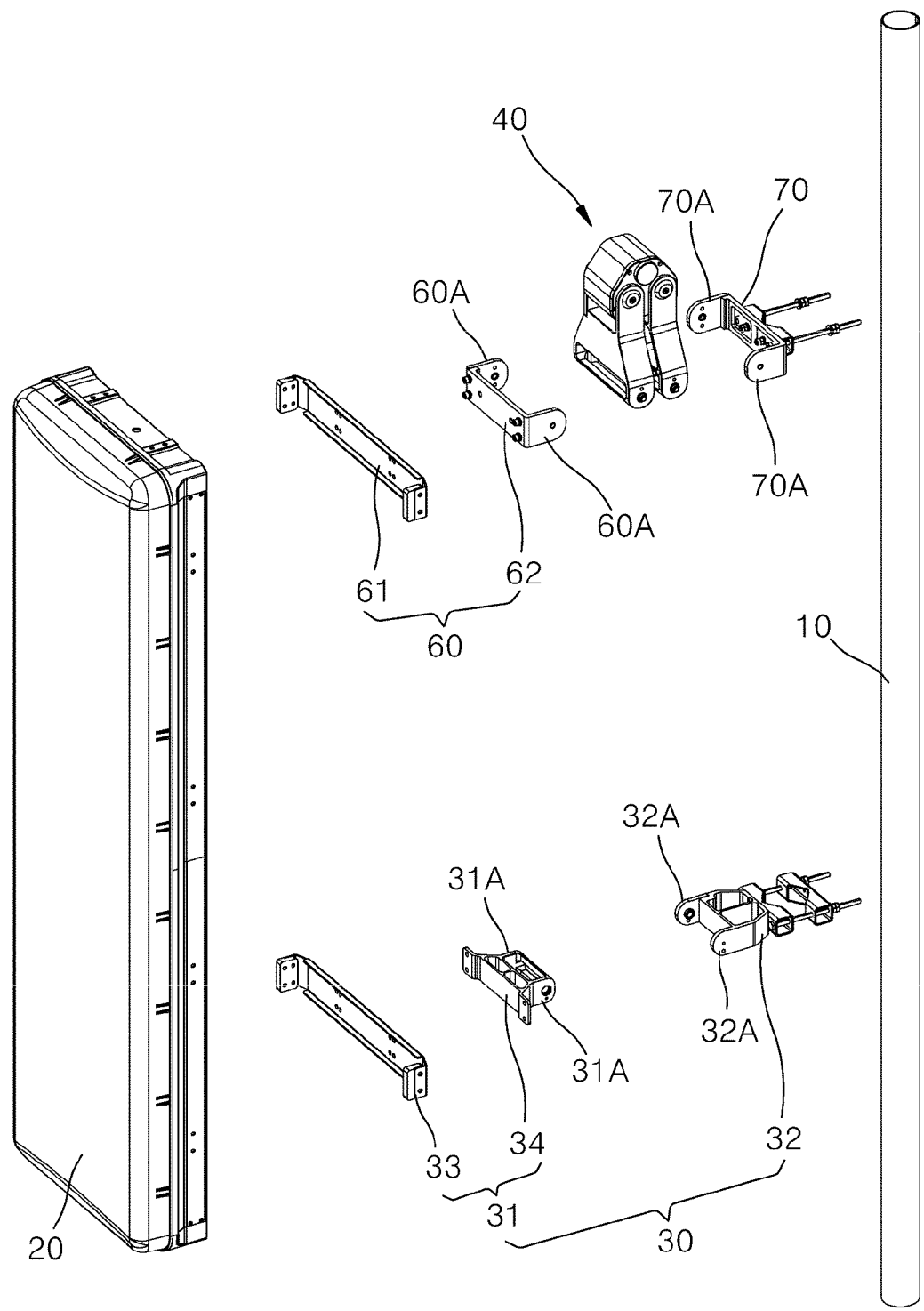
FIG. 3 is an exploded perspective view of FIG. 1.
Figure 4:
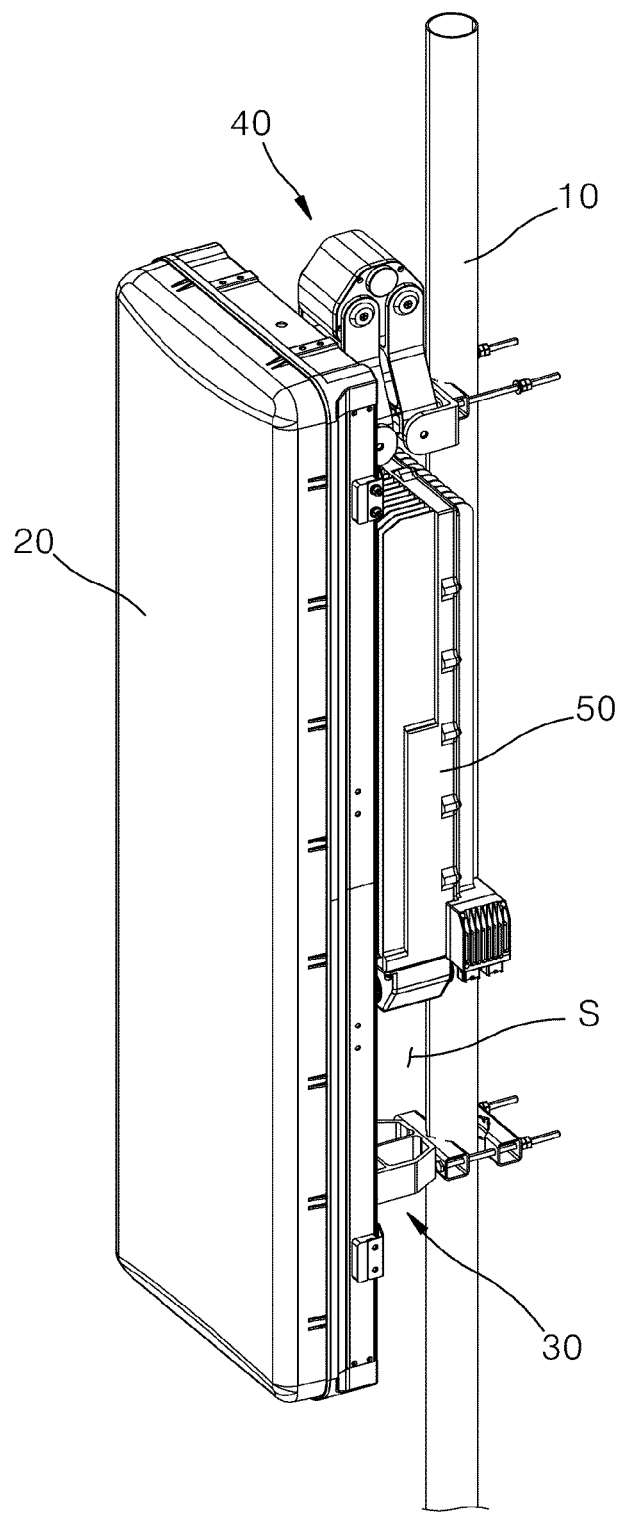
FIG. 4 is a view illustrating a state in which a radio unit is coupled to an antenna unit illustrated in FIG. 1.

FIG. 1 is a perspective view illustrating an antenna device according to an embodiment of the present invention, FIG. 2 is a side view illustrating the antenna device according to the embodiment of the present invention, FIG. 3 is an exploded perspective view of FIG. 1, and FIG. 4 is a view illustrating a state in which a radio unit is coupled to an antenna unit illustrated in FIG. 1.

Referring to FIGS. 1 to 4, an antenna device according to the embodiment of the present invention may include a pole 10, an antenna unit 20, a lower link unit 30, and a tilt drive unit 40.

The pole 10 may be formed in a bar shape elongated in an upward/downward direction. The pole 10 may be formed in a bar shape having a circular cross-section. The pole 10 may support components of the antenna device according to the embodiment of the present invention, except for the pole 10 itself.

The antenna unit 20 may be formed in an approximately quadrangular container shape. A substrate on which an antenna element is mounted may be installed in the antenna unit 20.

The lower link unit 30 may couple a lower portion of the antenna unit 20 to the pole 10 so that the antenna unit 20 is rotatable in an upward/downward direction.

The tilt drive unit 40 may couple an upper portion of the antenna unit 20 to the pole 10. The tilt drive unit 40 may tilt the antenna unit 20 by rotating the upper portion of the antenna unit 20 about a rotation center of the lower link unit 30.

The tilt drive unit 40 may be formed in a shape folded downward in a state in which the antenna unit 20 is vertically disposed.

The pole 10 may be disposed to be spaced apart rearward from the antenna unit 20. The antenna unit 20 may be disposed to be spaced apart forward from the pole 10. The lower link unit 30 may be disposed to be spaced apart downward from the tilt drive unit 40. The lower link unit 30 may connect the pole 10 and the antenna unit 20. The tilt drive unit 40 may be disposed to be spaced apart upward from the lower link unit 30. The tilt drive unit 40 may connect the pole 10 and the antenna unit 20.

A radio unit (RU) 50 may be coupled to the antenna unit 20. The radio unit 50 may be disposed on a rear surface of the antenna unit 20. The radio unit 50 may be disposed in an internal space S defined by the pole 10, the antenna unit 20, the lower link unit 30, and the tilt drive unit 40.

The antenna unit 20 may transmit a wireless signal to the radio unit 50 and receive a wireless signal from the radio unit 50. The radio unit 50 may process the wireless signal received from the antenna unit 20.

When the antenna unit 20 is tilted by an operation of the tilt drive unit 40, a size of the internal space S may be changed. Therefore, it is possible to ensure the internal space S in which the radio unit 50 is installed. Of course, the radio unit 50 may not be necessarily installed in the internal space S. That is, the radio unit 50 may not be installed on the rear surface of the antenna unit 20, but only the antenna unit 20 may be provided thereon.

Alternatively, another component related to the antenna may be installed on the rear surface of the antenna unit 20, instead of the radio unit 50.

In a case in which the antenna device according to the embodiment of the present invention includes only the antenna unit 20 without including the radio unit 50, the antenna device according to the embodiment of the present invention may be used by a communication carrier that installs a base station. Alternatively, in a case in which the antenna device according to the embodiment of the present invention includes both the antenna unit 20 and the radio unit 50, the antenna device according to the embodiment of the present invention may be used by a network equipment company that manufactures the base station.

An upper mounting bracket 60 may be coupled to the upper portion of the antenna unit 20. The upper mounting bracket 60 may have first coupling portions 60A protruding toward the pole 10. The upper mounting bracket 60 may have the first coupling portions 60A protruding rearward. The first coupling portions 60A may be coupled to a first tilt arm 410 (see FIGS. 5 and 6) of the tilt drive unit 40 so as to be rotatable in the upward/downward direction. The first coupling portions 60A may be provided as a pair of first coupling portions 60A spaced apart from each other in a transverse direction of the antenna unit 20.

The upper mounting bracket 60 may include a front upper mounting bracket 61 and a rear upper mounting bracket 62.

The front upper mounting bracket 61 may be disposed forward of the rear upper mounting bracket 62. The rear upper mounting bracket 62 may be disposed rearward of the front upper mounting bracket 61. The front upper mounting bracket 61 and the rear upper mounting bracket 62 may be fastened to each other by means of a plurality of screws.

The front upper mounting bracket 61 may be elongated in a leftward/rightward direction. Two opposite ends of the front upper mounting bracket 61 may be bent forward and respectively fastened to two opposite surfaces of the antenna unit 20 by means of a plurality of screws.

The rear upper mounting bracket 62 may be elongated in the leftward/rightward direction. The rear upper mounting bracket 62 may have a shorter length in the leftward/rightward direction than the front upper mounting bracket 61. The pair of first coupling portions 60A may be respectively bent rearward from the two opposite ends of the rear upper mounting bracket 62.

An upper mounting clamp 70 may be coupled to an upper portion of the pole 10. The upper mounting clamp 70 may have second coupling portions 70A protruding toward the antenna unit 20. The upper mounting clamp 70 may have the second coupling portion 70A protruding forward. The second coupling portions 70A may be coupled to a second tilt arm 420 (see FIGS. 5 and 6) of the tilt drive unit 40 so as to be rotatable in the upward/downward direction. The second coupling portions 70A may be provided as a pair of second coupling portions 70A spaced apart from each other in the transverse direction of the antenna unit 20.

A length of a front portion of the upper mounting clamp 70 in the leftward/rightward direction may be equal to a length of the rear upper mounting bracket 62 in the leftward/rightward direction. The pair of second coupling portions 70A may be respectively bent forward from two opposite ends of the front portion of the upper mounting clamp 70.

The lower link unit 30 may include a lower mounting bracket 31 and a lower mounting clamp 32.

The lower mounting bracket 31 may be coupled to the lower portion of the antenna unit 20. The lower mounting bracket 31 may have third coupling portions 31A protruding toward the pole 10. The lower mounting bracket 31 may have the third coupling portions 31A protruding rearward. The third coupling portions 31A may be provided as a pair of third coupling portions 31A spaced apart from each other in the transverse direction of the antenna unit 20.

The lower mounting bracket 31 may include a front lower mounting bracket 33 and a rear lower mounting bracket 34.

The front lower mounting bracket 33 may be disposed forward of the rear lower mounting bracket 34. The rear lower mounting bracket 34 may be disposed rearward of the front lower mounting bracket 33. The front lower mounting bracket 33 and the rear lower mounting bracket 34 may be fastened to each other by means of a plurality of screws.

The front lower mounting bracket 33 may have the same shape and size as the front upper mounting bracket 61. That is, the front lower mounting bracket 33 may be elongated in the leftward/rightward direction. Two opposite ends of the front lower mounting bracket 33 may be bent forward and respectively fastened to the two opposite surfaces of the antenna unit 20 by means of a plurality of screws.

The rear lower mounting bracket 34 may be elongated in the leftward/rightward direction. The rear lower mounting bracket 34 may have a shorter length in the leftward/rightward direction than the front lower mounting bracket 33. The pair of third coupling portions 31A may each protrude rearward from a rear surface of the rear lower mounting bracket 34.

The lower mounting clamp 32 may be coupled to a lower portion of the pole 10. The lower mounting clamp 32 may have fourth coupling portions 32A protruding toward the antenna unit 20. The lower mounting clamp 32 may have the fourth coupling portions 32A protruding rearward. The fourth coupling portions 32A may be provided as a pair of fourth coupling portions 32A spaced apart from each other in the transverse direction of the antenna unit 20.

The pair of fourth coupling portions 32A may be respectively bent forward from the two opposite ends of the front portion of the lower mounting clamp 32.

The third coupling portions 31A and the fourth coupling portions 32A may be coupled to one another so as to be rotatable in the upward/downward direction, such that the lower link unit 30 may be coupled to be rotatable in the upward/downward direction.

For example, the pair of third coupling portions 31A may respectively have first hinge holes that are formed through in the leftward/rightward direction, and the pair of fourth coupling portions 32A may respectively have first hinge protrusions that are respectively inserted into the first hinge holes and disposed to be rotatable relative to the first hinge holes, such that the lower link unit 30 may be coupled to be rotatable in the upward/downward direction. The first hinge holes and the first hinge protrusions may define a rotation center of the lower link unit 30.

The first coupling portions 60A, the second coupling portions 70A, the third coupling portions 31A, and the fourth coupling portions 32A may each be formed in a plate shape. Hereinafter, the tilt drive unit 40 will be described in detail.

Figure 5:
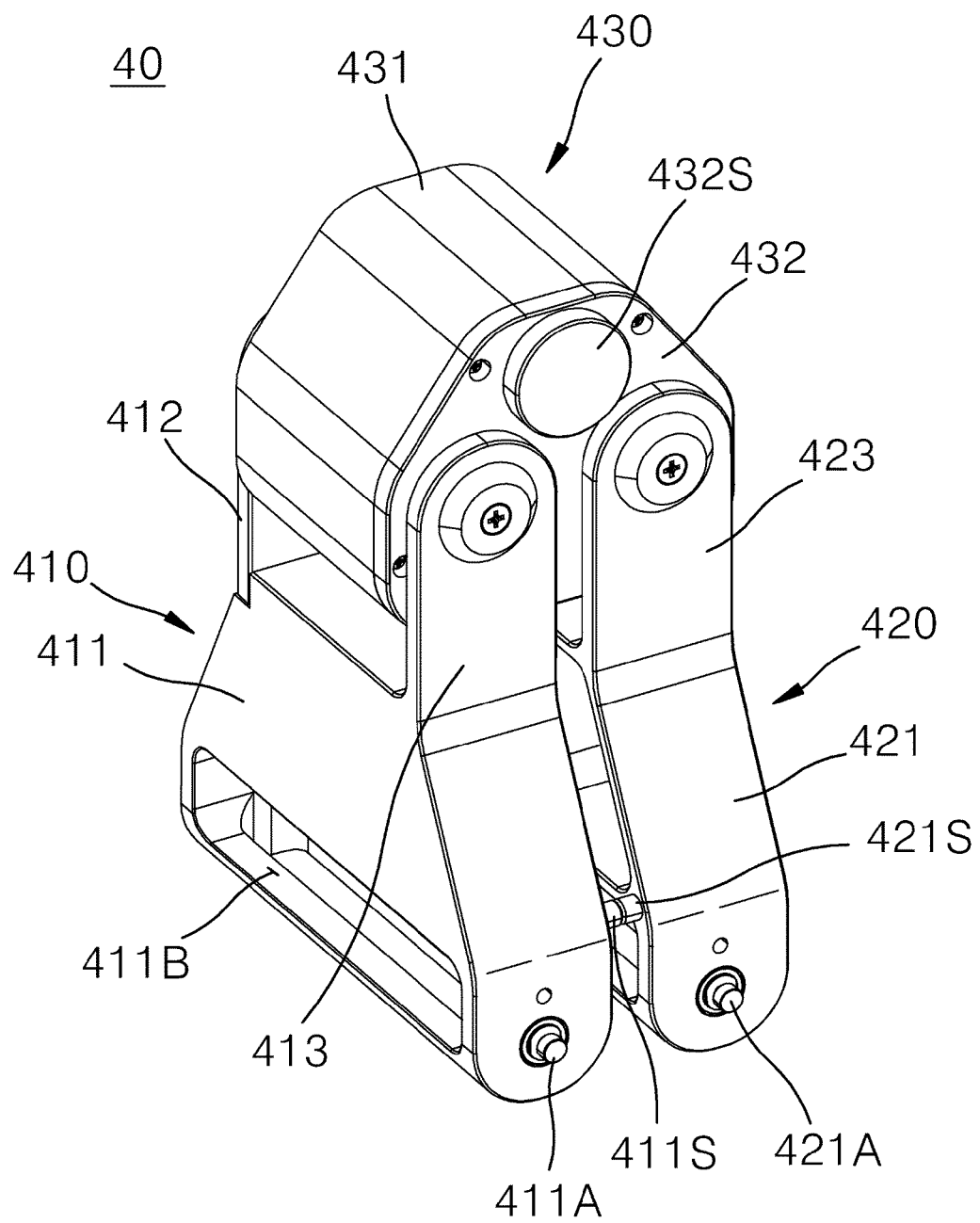
FIG. 5 is a perspective view illustrating a first embodiment of a tilt drive unit illustrated in FIG. 3.
Figure 6:
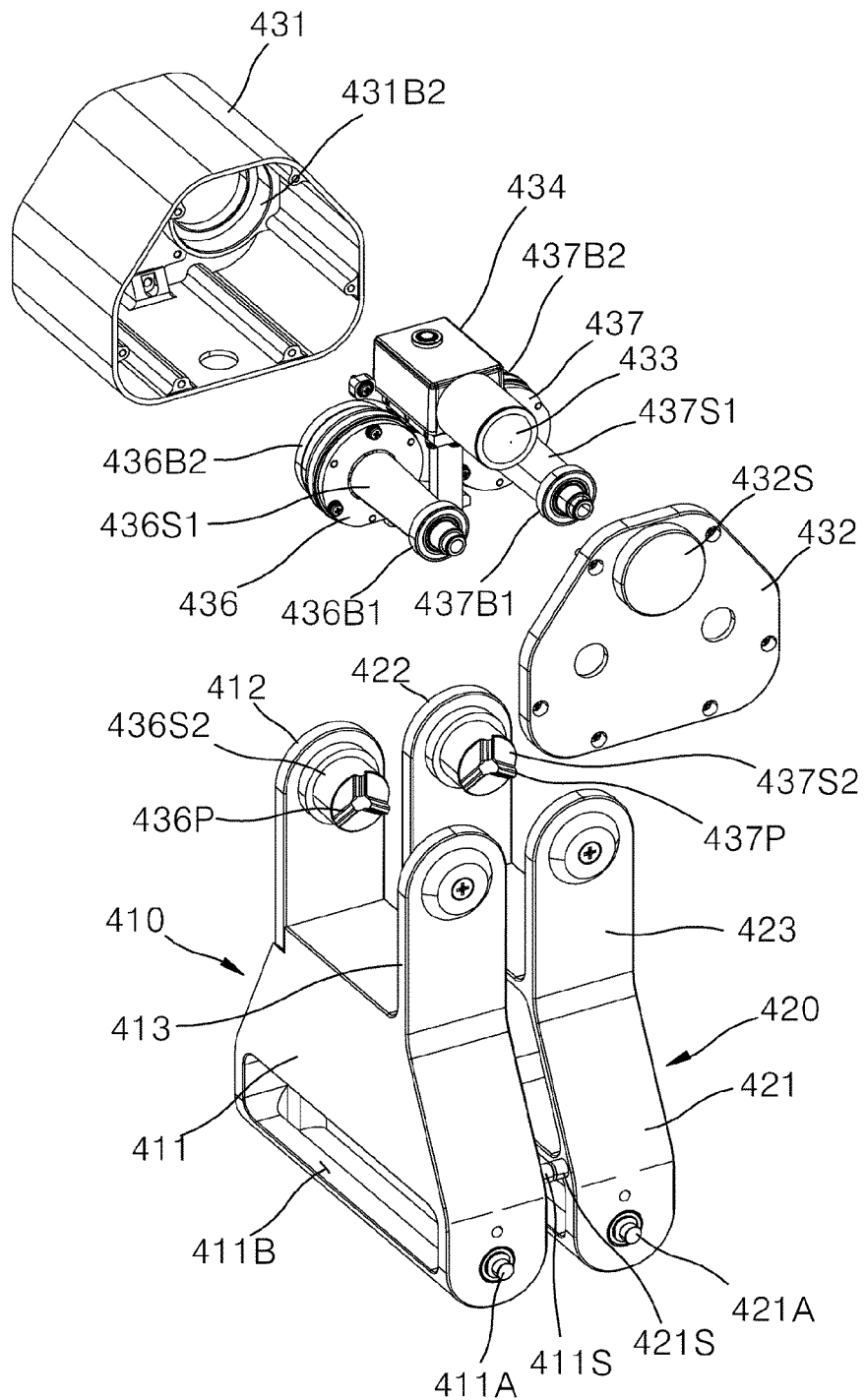
FIG. 6 is an exploded perspective view of FIG. 5.
Figure 7:
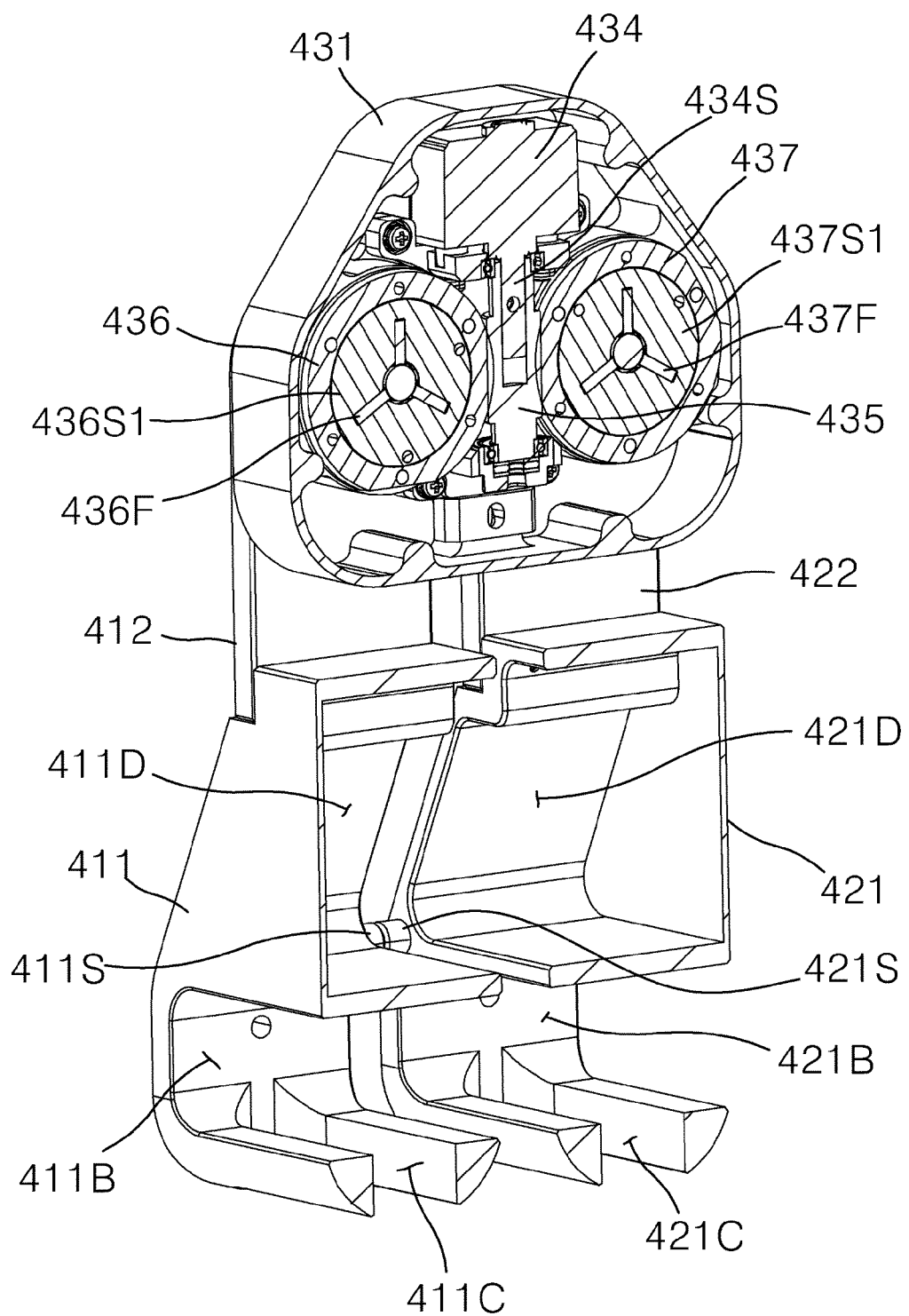
FIG. 7 is a cut-away perspective view of FIG. 5.
Figure 8:
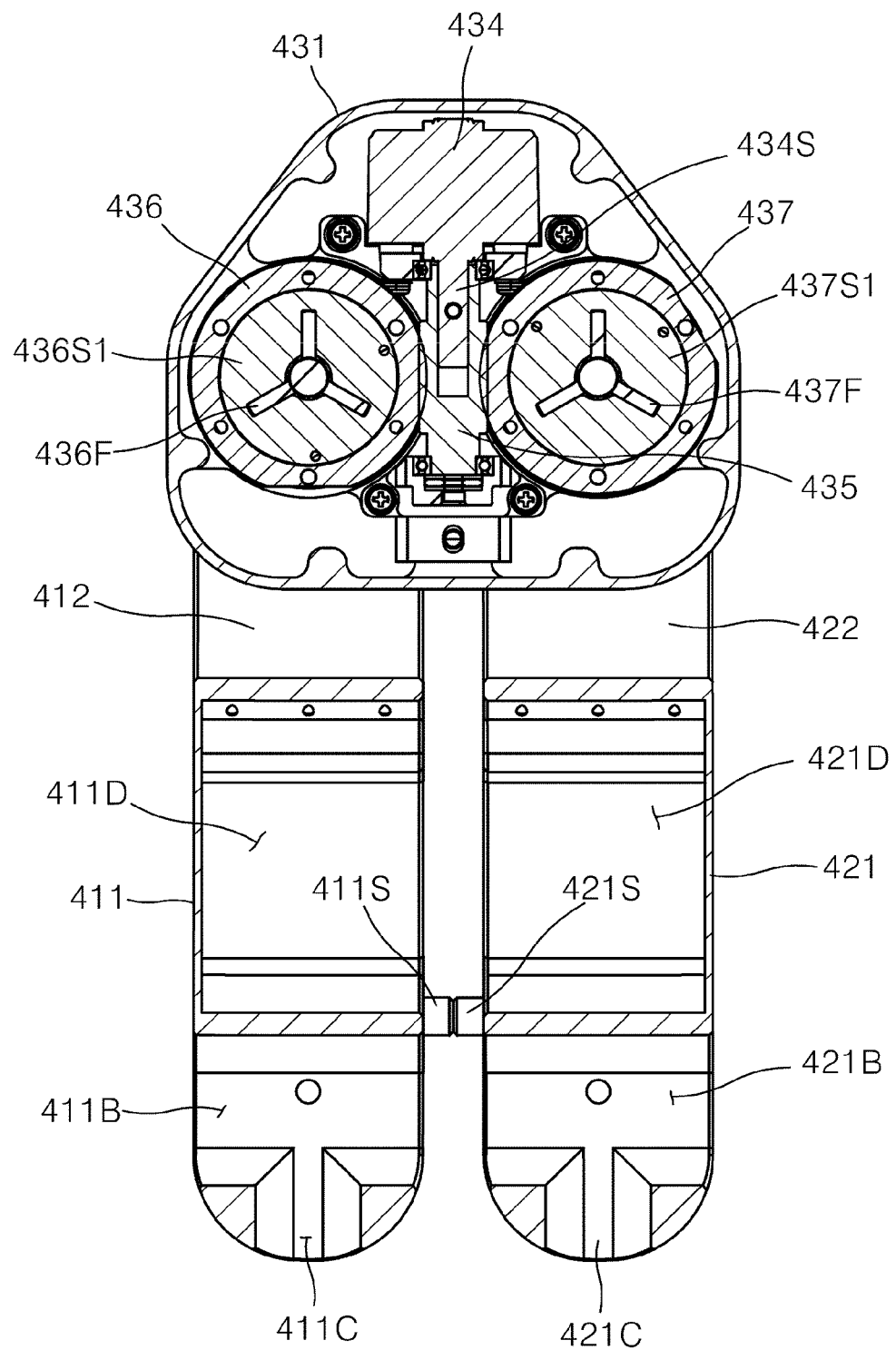
FIG. 8 is a cross-sectional side view illustrating the tilt drive unit illustrated in FIG. 3.
Figure 9:
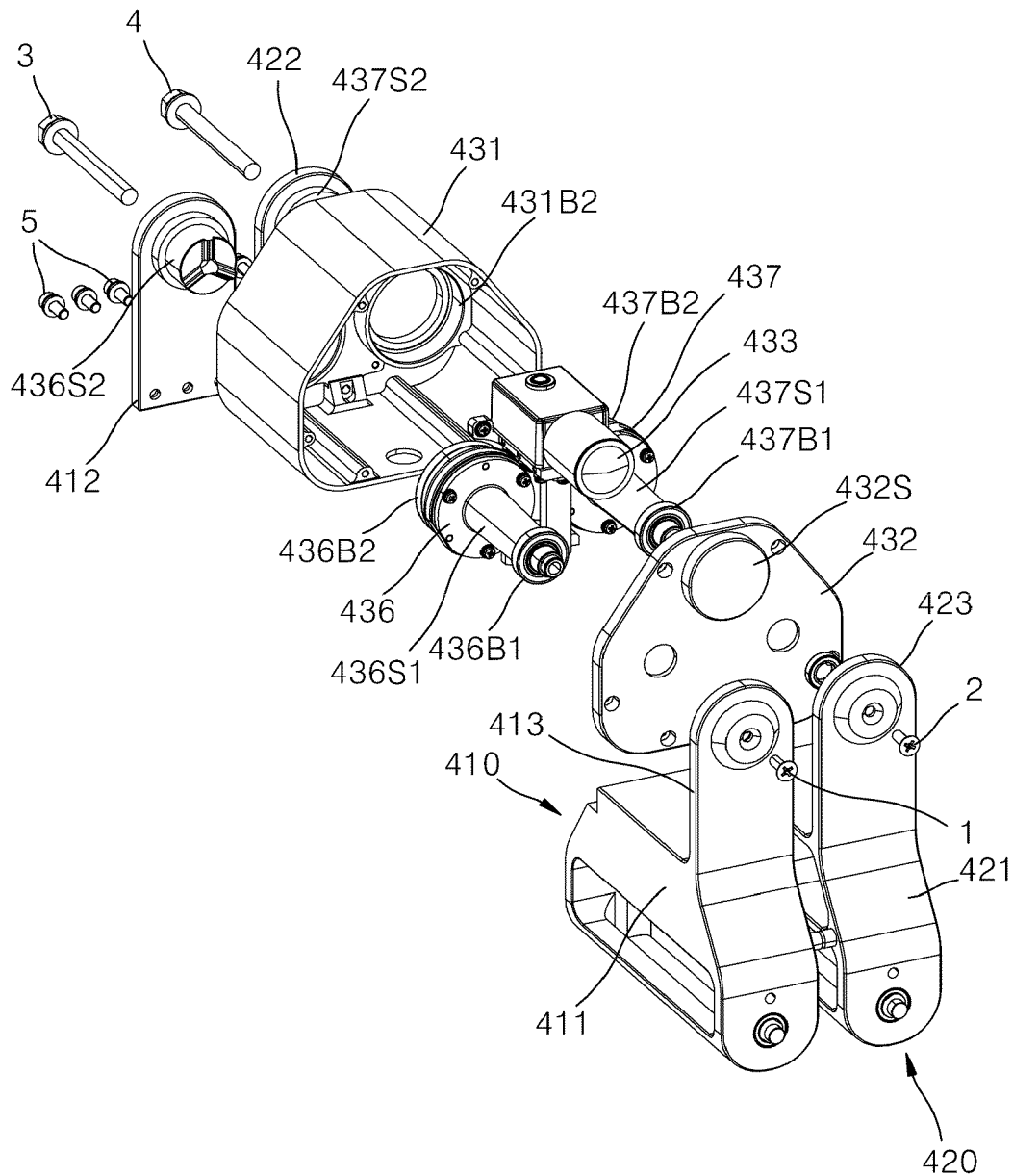
FIG. 9 is an exploded perspective view illustrating one side of the tilt drive unit illustrated in FIG. 3.
Figure 10:
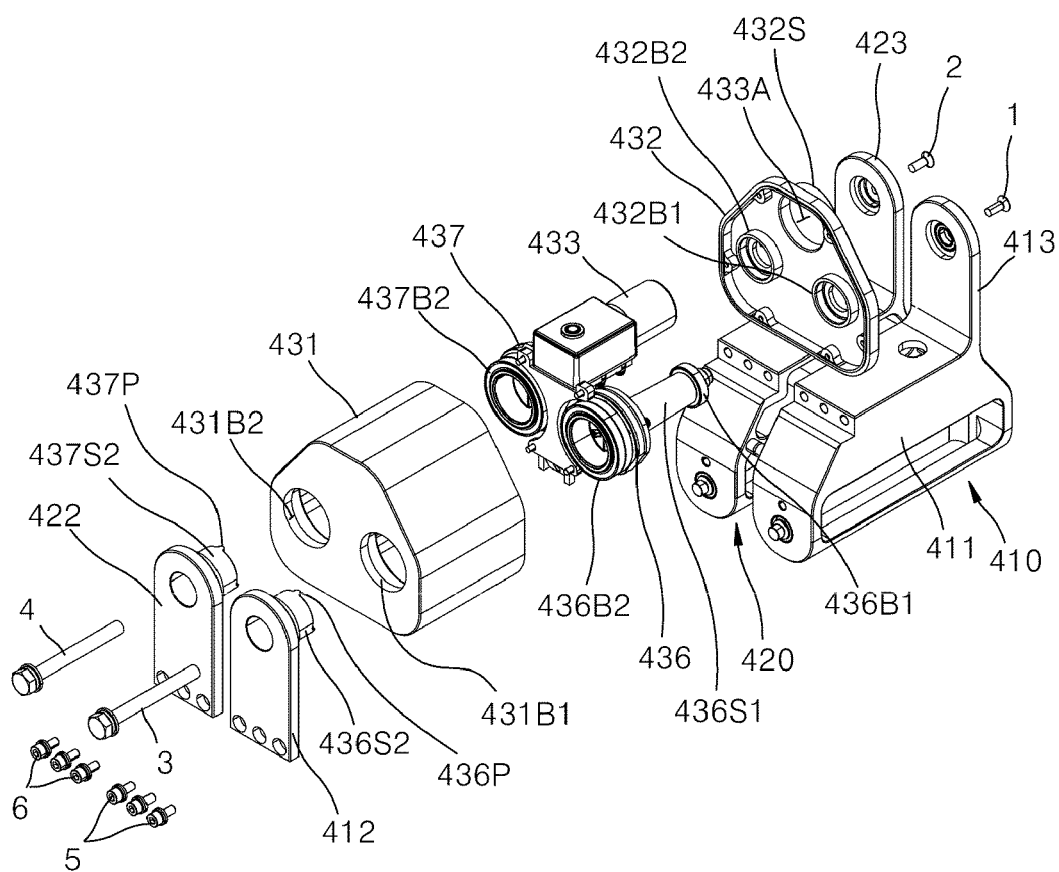
FIG. 10 is an exploded perspective view illustrating the other side of the tilt drive unit illustrated in FIG. 3.

FIG. 5 is a perspective view illustrating a first embodiment of the tilt drive unit illustrated in FIG. 3, FIG. 6 is an exploded perspective view of FIG. 5, FIG. 7 is a cut-away perspective view of FIG. 5, FIG. 8 is a cross-sectional side view illustrating the tilt drive unit illustrated in FIG. 3, FIG. 9 is an exploded perspective view illustrating one side of the tilt drive unit illustrated in FIG. 3, and FIG. 10 is an exploded perspective view illustrating the other side of the tilt drive unit illustrated in FIG. 3.

Referring to FIGS. 3 and 5 to 10, the tilt drive unit 40 according to the first embodiment may include the first tilt arm 410, the second tilt arm 420, and a tilt drive part 430.

The first tilt arm 410 may be coupled to the antenna unit 20. Specifically, a lower portion of the first tilt arm 410 may be rotatably coupled to the first coupling portions 60A of the upper mounting bracket 60.

For example, second hinge protrusions 411A may be respectively formed at two opposite sides of the lower portion of the first tilt arm 410. The pair of first coupling portions 60A may respectively have second hinge holes formed through in the leftward/rightward direction. The second hinge protrusions 411A may be respectively inserted into the second hinge holes and rotatably disposed, such that the lower portion of the first tilt arm 410 may be rotatably coupled to the first coupling portions 60A.

The second tilt arm 420 may be coupled to the pole 10. Specifically, a lower portion of the second tilt arm 420 may be rotatably coupled to the second coupling portions 70A of the upper mounting clamp 70.

For example, third hinge protrusions 421A may be respectively formed at two opposite sides of the lower portion of the second tilt arm 420. The pair of second coupling portions 70A may respectively have third hinge holes formed through in the leftward/rightward direction. The third hinge protrusions 421A may be respectively inserted into the third hinge holes and rotatably disposed, such that the lower portion of the second tilt arm 420 may be rotatably coupled to the second coupling portions 70A.

The tilt drive part 430 may include tilt drive housings 431 and 432, a tilt motor 433, a speed reducer 434, a worm gear 435, a first worm wheel 436, and a second worm wheel 437.

The tilt drive housings 431 and 432 may define an external appearance of the tilt drive part 430. The tilt motor 433, the speed reducer 434, the worm gear 435, the first worm wheel 436, and the second worm wheel 437 may be accommodated in the tilt drive housings 431 and 432.

The tilt drive housings 431 and 432 may include a housing main body 431 and a housing cover 432. The housing main body 431 may have an internal space that accommodates the tilt motor 433, the speed reducer 434, the worm gear 435, the first worm wheel 436, and the second worm wheel 437.

The housing cover 432 may cover one opened side of the housing main body 431.

The tilt motor 433 may be a driving source configured to tilt the antenna unit 20.

The speed reducer 434 may amplify driving power inputted from the tilt motor 433 and output the amplified driving power. A plurality of gears may engage with one another in the speed reducer 434. The plurality of gears may have different rotation ratios. The speed reducer 434 may reduce a rotational speed outputted through the plurality of gears by receiving a rotational speed of a rotary shaft of the tilt motor 433, and the speed reducer 434 outputs torque higher than a rotational force of the rotary shaft of the tilt motor 433. Therefore, it is possible to tilt the antenna unit 20 even by using the motor having a small capacity. That is, the speed reducer 434 may amplify output torque of the tilt motor 433 and transmit the amplified output torque to the worm gear 435.

The worm gear 435 may be rotated by the driving power of the tilt motor 433. The worm gear 435 may be vertically disposed between the first worm wheel 436 and the second worm wheel 437. The worm gear 435 may engage with the first worm wheel 436 and the second worm wheel 437.

The first worm wheel 436 may rotate the first tilt arm 410 by being rotated by the rotation of the worm gear 435.

The second worm wheel 436 may rotate the second tilt arm 420 by being rotated by the rotation of the worm gear 435.

An upper portion of the first tilt arm 410 may be coupled to rotary shafts 436S1 and 436S2 of the first worm wheel 436.

An upper portion of the second tilt arm 420 may be coupled to rotary shafts 437S1 and 437S2 of the second worm wheel 437.

The first tilt arm 410 may include a first tilt arm main body 411, a first extension portion 412, and a second extension portion 413.

Two opposite lower portions of the first tilt arm main body 411 may be rotatably coupled to the pair of first coupling portions 60A formed on the upper mounting bracket 60. That is, the second hinge protrusions 411A may be respectively formed on the two opposite lower portions of the first tilt arm main body 411 and respectively inserted into the second hinge holes and rotatably disposed, the second hinge holes being respectively formed in the pair of first coupling portions 60A.

The first extension portion 412 may extend upward from one side upper end of the first tilt arm main body 411. An upper portion of the first extension portion 412 may be coupled to one end of the rotary shaft 436S1 and one end of the rotary shaft 436S2 of the first worm wheel 436.

An upper portion of the second extension portion 413 may extend upward from the other side upper end of the first tilt arm main body 411. The second extension portion 413 may be coupled to the other end of the rotary shaft 436S1 and the other end of the rotary shaft 436S2 of the first worm wheel.

The second tilt arm 420 may include a second tilt arm main body 421, a third extension portion 422, and a fourth extension portion 423.

Two opposite lower portions of the second tilt arm main body 421 may be rotatably coupled to the pair of second coupling portions 70A formed on the upper mounting clamp 70. That is, the third hinge protrusions 421A may be respectively formed on the two opposite lower portions of the second tilt arm main body 421 and respectively inserted into the third hinge holes and rotatably disposed, the third hinge holes being respectively formed in the pair of second coupling portions 70A.

The third extension portion 422 may extend upward from one side upper end of the second tilt arm main body 421. The third extension portion 422 may be coupled to the rotary shafts 437S1 and 437S2 of the second worm wheel 437.

The fourth extension portion 423 may extend upward from the other side upper end of the second tilt arm main body 421. The fourth extension portion 423 may be coupled to the rotary shafts 437S1 and 437S2 of the second worm wheel 437.

The first extension portion 412, the second extension portion 413, the third extension portion 422, and the fourth extension portion 423 may each be formed in a plate shape.

The tilt drive housings 431 and 432 may be disposed between the first extension portion 412 and the third extension portion 422 and between the second extension portion 413 and the fourth extension portion 423. Therefore, a vertical length of the tilt drive unit 40 may be decreased, such that a maximum size of the internal space S defined by the pole 10, the antenna unit 20, the lower link unit 30, and the tilt drive unit 40 may be ensured.

One of the first extension portion 412 and the second extension portion 413 may be separably fastened to the first tilt arm main body 411. In the present embodiment, the first extension portion 412 may be separably fastened to the first tilt arm main body 411 by means of a plurality of screws 5. In addition, one of the third extension portion 422 and the fourth extension portion 423 may be separably fastened to the second tilt arm main body 421. In the present embodiment, the third extension portion 422 may be separably fastened to the second tilt arm main body 421 by means of a plurality of screws 6. Such separable structures may allow the tilt drive unit 40 to be quickly assembled and allow the tilt drive part 430 to be quickly repaired when the tilt drive part 430 is broken down.

Meanwhile, the rotary shafts 436S1 and 436S2 of the first worm wheel 436 may include a first rotary shaft portion 436S1 and a second rotary shaft portion 436S2. The first worm wheel 436 may be coupled to an outer periphery of the first rotary shaft portion 436S1.

An outer end of the first rotary shaft portion 436S1 may be fastened to any one of the first extension portion 412 and the second extension portion 413. In the present embodiment, the outer end of the first rotary shaft portion 436S1 is fastened to the second extension portion 413. Specifically, a screw 1 may be fastened by being inserted into a hole, formed in an upper portion of the second extension portion 413, from the outside of the second extension portion 413, passing through a hole formed in the housing cover 432, and then being inserted into a groove formed at the outer end of the first rotary shaft portion 436S1.

The second rotary shaft portion 436S2 may be integrated with the other of the first extension portion 412 and the second extension portion 413. In the present embodiment, the second rotary shaft portion 436S2 is integrated with the first extension portion 412.

The second rotary shaft portion 436S2 may be fastened to an inner end of the first rotary shaft portion 436S1. Specifically, a bolt 3 may be fastened by being inserted into a hole, formed in an upper portion of the first extension portion 412, from the outside of the first extension portion 412, passing through a hole penetratively formed, in an axial direction, at a center of the second rotary shaft portion 436S2, and then being inserted into a groove formed, in the axial direction, at a center of the inner end of the first rotary shaft portion 436S1.

The rotary shafts 437S1 and 437S2 of the second worm wheel 437 may include a third rotary shaft portion 437S1 and a fourth rotary shaft portion 437S2. The second worm wheel 437 may be coupled to an outer periphery of the third rotary shaft portion 437S1.

An outer end of the third rotary shaft portion 437S1 may be fastened to any one of the third extension portion 422 and the fourth extension portion 423. In the present embodiment, the outer end of the third rotary shaft portion 437S1 may be fastened to the fourth extension portion 423. Specifically, a screw 2 may be fastened by being inserted into a hole, formed in an upper portion of the fourth extension portion 423, from the outside of the fourth extension portion 423, passing through a hole formed in the housing cover 432, and then being inserted into a groove formed at the outer end of the third rotary shaft portion 437S1.

The fourth rotary shaft portion 437S2 may be integrated with the other of the third extension portion 422 and the fourth extension portion 423. In the present embodiment, the fourth rotary shaft portion 437S2 is integrated with the third extension portion 422.

The fourth rotary shaft portion 437S2 may be fastened to an inner end of the third rotary shaft portion 437S1. Specifically, a bolt 4 may be fastened by being inserted into a hole, formed in an upper portion of the third extension portion 422, from the outside of the third extension portion 422, passing through a hole penetratively formed, in the axial direction, at a center of the fourth rotary shaft portion 437S2, and then being inserted into a groove formed, in the axial direction, at a center of the inner end of the third rotary shaft portion 437S1.

Meanwhile, a first catching protrusion 436P extending to the center from the outside may be formed on any one of a facing surface of the inner end of the first rotary shaft portion 436S1 and a facing surface of the inner end of the second rotary shaft portion 436S2. In addition, a first catching groove 436F extending to the center from the outside may be formed in the other of the facing surface of the inner end of the first rotary shaft portion 436S1 and the facing surface of the inner end of the second rotary shaft portion 436S2. In the present embodiment, the first catching protrusion 436P is formed on the facing surface of the inner end of the second rotary shaft portion 436S2, and the first catching groove 436F is formed in the facing surface of the inner end of the first rotary shaft portion 436S1.

The first catching protrusion 436P may be provided as a plurality of first catching protrusions 436P spaced apart from one another in a circumferential direction of the rotary shafts 436S1 and 436S2 of the first worm wheel 436. In the present embodiment, three first catching protrusions 436P are provided. In addition, the first catching groove 436F may be provided as a plurality of first catching grooves 436F spaced apart from one another in the circumferential direction of the rotary shafts 436S1 and 436S2 of the first worm wheel 436. In the present embodiment, three first catching grooves 436F are provided. The first catching protrusion 436P and the first catching groove 436F may be equal in number to each other.

The first catching protrusion 436P may be inserted into the first catching groove 436F. In the state in which the first rotary shaft portion 436S1 and the second rotary shaft portion 436S2 are fastened to each other by the bolt 3, the first catching protrusion 436P may be inserted into the first catching groove 436F. Therefore, the rotational force of the first rotary shaft portion 436S1 may be transmitted to the second rotary shaft portion 436S2 without loss.

In addition, a second catching protrusion 437P extending to the center from the outside may be formed on any one of a facing surface of the inner end of the third rotary shaft portion 437S1 and a facing surface of the inner end of the fourth rotary shaft portion 437S2. In addition, a second catching groove 437F extending to the center from the outside may be formed in the other of the facing surface of the inner end of the third rotary shaft portion 437S1 and the facing surface of the inner end of the fourth rotary shaft portion 437S2. In the present embodiment, the second catching protrusion 437P is formed on the facing surface of the inner end of the fourth rotary shaft portion 437S2, and the second catching groove 437F is formed in the facing surface of the inner end of the third rotary shaft portion 437S1.

The second catching protrusion 437P may be provided as a plurality of second catching protrusions 437P spaced apart from one another in a circumferential direction of the rotary shafts 437S1 and 437S2 of the second worm wheel 437. In the present embodiment, three second catching protrusions 437P are provided. In addition, the second catching groove 437F may be provided as a plurality of second catching grooves 437F spaced apart from one another in the circumferential direction of the rotary shafts 437S1 and 437S2 of the second worm wheel 437. In the present embodiment, three second catching grooves 437F are provided. The second catching protrusion 437P and the second catching groove 437F may be equal in number to each other.

The second catching protrusion 437P may be inserted into the second catching groove 437F. In the state in which the third rotary shaft portion 437S1 and the fourth rotary shaft portion 437S2 are fastened to each other by the bolt 4, the second catching protrusion 437P may be inserted into the second catching groove 437F. Therefore, the rotational force of the third rotary shaft portion 437S1 may be transmitted to the fourth rotary shaft portion 437S2 without loss.

First stoppers 411S and 421S may respectively protrude on a facing surface of the first tilt arm main body 411 and a facing surface of the second tilt arm main body 421. The first stoppers 411S and 421S may be in contact with each other when the antenna unit 20 is minimally tilted. Therefore, the first stoppers 411S and 421S may prevent the first tilt arm main body 411 and the second tilt arm main body 421 from colliding with each other while being retracted, thereby suppressing noise.

The first stoppers 411S and 421S may include a first-first stopper 411S and a first-second stopper 421S.

The first-first stopper 411S may protrude from a rear surface of the first tilt arm main body 411. The first-first stopper 411S may be provided as a plurality of first-first stoppers 411S formed on the rear surface of the first tilt arm main body 411 and spaced apart from one another in the leftward/rightward direction.

The first-second stopper 421S may protrude from a front surface of the second tilt arm main body 421. The first-second stopper 421S may be provided as a plurality of first-second stoppers 421S formed on the front surface of the second tilt arm main body 421 and spaced apart from one another in the leftward/rightward direction.

In addition, a second stopper 432S may protrude from an outer surface of the tilt drive housings 431 and 432. The second stopper 432S may protrude from an outer surface of the housing cover 432. The second stopper 432S may be formed in a circular shape. A motor support hole 433A may be formed in an inner surface of the second stopper 432S, and one end of the tilt motor 433 is inserted into and supported by the motor support hole 433A.

When the antenna unit 20 is maximally tilted, at least one of the first extension portion 412 and the second extension portion 413 may be in close contact with the second stopper 432S. In addition, when the antenna unit 20 is maximally tilted, at least one of the third extension portion 422 and the fourth extension portion 423 may be in contact with the second stopper 432S. In the present embodiment, when the antenna unit 20 is maximally tilted, the second extension portion 413 and the fourth extension portion 423 are in contact with the second stopper 432S. Therefore, the second stopper 432S may prevent the first tilt arm main body 411 and the second tilt arm main body 421 from colliding with each other while being spread from each other, thereby suppressing noise.

Meanwhile, internal open spaces 411D and 421D may be respectively formed in an upper portion of the first tilt arm main body 411 and an upper portion of the second tilt arm main body 421. The internal open spaces 411D and 421D may be formed so that facing sides of the first and second tilt arm main bodies 411 and 421 are opened. Because the internal open spaces 411D and 421D are formed, weights of the first and second tilt arms 410 and 420 may be reduced.

In addition, first opening holes 411B and 421B may be respectively formed in a lower portion of the first tilt arm main body 411 and a lower portion of the second tilt arm main body 421. The first opening holes 411B and 421B may be formed through from the antenna unit 20 to the pole 10. The first opening holes 411B and 421B may be formed through in a forward/rearward direction. Because the first opening holes 411B and 421B are formed, weights of the first and second tilt arms 410 and 420 may be reduced.

The internal open spaces 411D and 421D may be formed above the first stoppers 411S and 421S, and the first opening holes 411B and 421B may be formed below the first stoppers 411S and 421S.

In addition, second opening holes 411C and 421C may be further respectively formed at a lower side of the first tilt arm main body 411 and a lower side of the second tilt arm main body 421. The second opening holes 411C and 421C may be formed to communicate with the first opening holes 411B and 421B. The second opening holes 411C and 421C may extend downward from bottom sides of the first opening holes 411B and 421B. Because the second opening holes 411C and 421C are formed, weights of the first and second tilt arms 410 and 420 may be reduced.

Meanwhile, a first bearing 436B1 may be installed on an outer peripheral surface of an outer end of the first rotary shaft portion 436S1, and a second bearing 436B2 may be installed on an outer peripheral surface of an inner end of the first rotary shaft portion 436S1. The first bearing 436B1 and the second bearing 436B2 may support the first rotary shaft portion 436S1 so that the first rotary shaft portion 436S1 is rotatable.

A first bearing support portion 432B1 may be formed on an inner surface of the housing cover 432, and the first bearing 436B1 may be inserted into and supported by the first bearing support portion 432B1. A second bearing support portion 431B1 may be formed on an inner surface of the housing main body 431 that faces the housing cover 432, and the second bearing 436B2 may be inserted into and supported by the second bearing support portion 431B1.

The second rotary shaft portion 436S2 may be inserted into a hole formed in the housing main body 431 so as to communicate with an interior of the second bearing support portion 431B1, penetrate a center of the second bearing 436B2, and then be fastened to an inner end of the first rotary shaft portion 436S1 by means of the bolt 3 so that the second rotary shaft portion 436S2 integrated with the first extension portion 412 is fastened to the first rotary shaft portion 436S1.

In addition, a third bearing 437B1 may be installed on an outer peripheral surface of an outer end of the third rotary shaft portion 437S1, and a fourth bearing 437B2 may be installed on an outer peripheral surface of an inner end of the third rotary shaft portion 437S1. The third bearing 437B1 and the fourth bearing 437B2 may support the second rotary shaft portion 437S1 so that the second rotary shaft portion 437S1 is rotatable.

A third bearing support portion 432B2 may be formed on the inner surface of the housing cover 432, and the third bearing 437B1 may be inserted into and supported by the third bearing support portion 432B2. A fourth bearing support portion 431B2 may be formed on the inner surface of the housing main body 431 that faces the housing cover 432, and the fourth bearing 437B2 may be inserted into and supported by the fourth bearing support portion 431B2.

The fourth rotary shaft portion 437S2 may be inserted into a hole formed in the housing main body 431 so as to communicate with an interior of the fourth bearing support portion 431B2, penetrate a center of the fourth bearing 437B2, and then be fastened to an inner end of the third rotary shaft portion 437S1 by means of the bolt 4 so that the fourth rotary shaft portion 437S2 integrated with the third extension portion 422 is fastened to the third rotary shaft portion 437S1.

Figure 11:
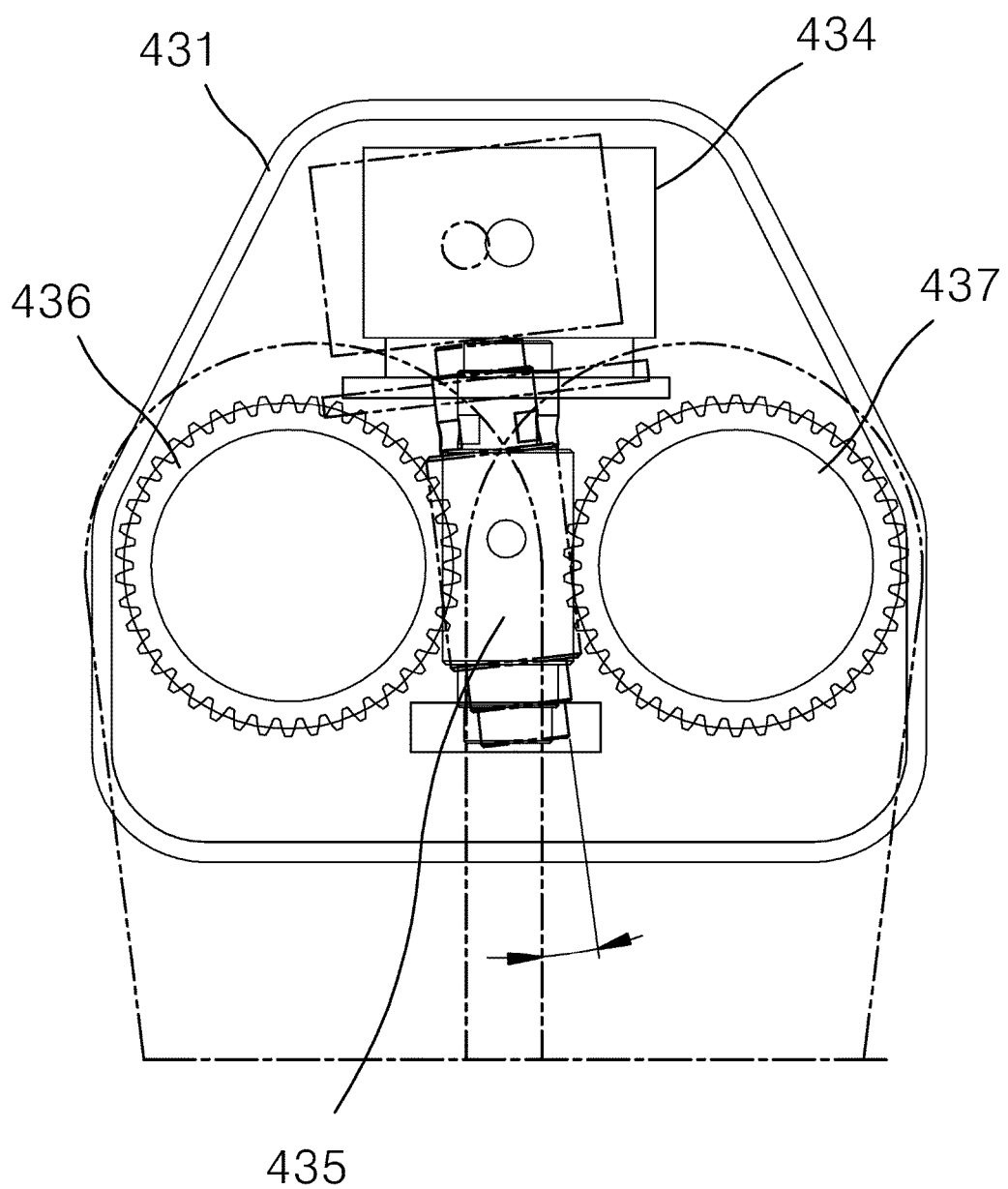
FIG. 11 is a cross-sectional view schematically illustrating an interior of a housing main body illustrated in FIG. 8.

FIG. 11 is a cross-sectional view schematically illustrating the interior of the housing main body illustrated in FIG. 8.

Referring to FIG. 11, the worm gear 435 may adjust a clearance between the worm gear 435 and the first worm wheel 436 and a clearance between the worm gear 435 and the second worm wheel 437 in order to suppress a backlash. Because the worm gear 435 is disposed between the first worm wheel 436 and the second worm wheel 437, the worm gear 435 may rotate in the circumferential direction of the worm wheels 436 and 437 and move toward the first worm wheel 436 or move toward the second worm wheel 437, thereby adjusting the clearance between the worm gear 435 and the first worm wheel 436 and the clearance between the worm gear 435 and the second worm wheel 437.

In the present embodiment, the speed reducer 434 from which the worm gear 435 protrudes downward is installed in the housing main body 431 and configured to be rotatable in the circumferential direction of the worm wheels 436 and 437, such that when the speed reducer 434 rotates, the worm gear 435 may rotate together with the speed reducer 434 and move toward the first worm wheel 436 or move toward the second worm wheel 437.

A motor may be installed on the housing main body 431 and rotate the speed reducer 434 in the circumferential direction of the worm wheels 436 and 437.

Figure 12:
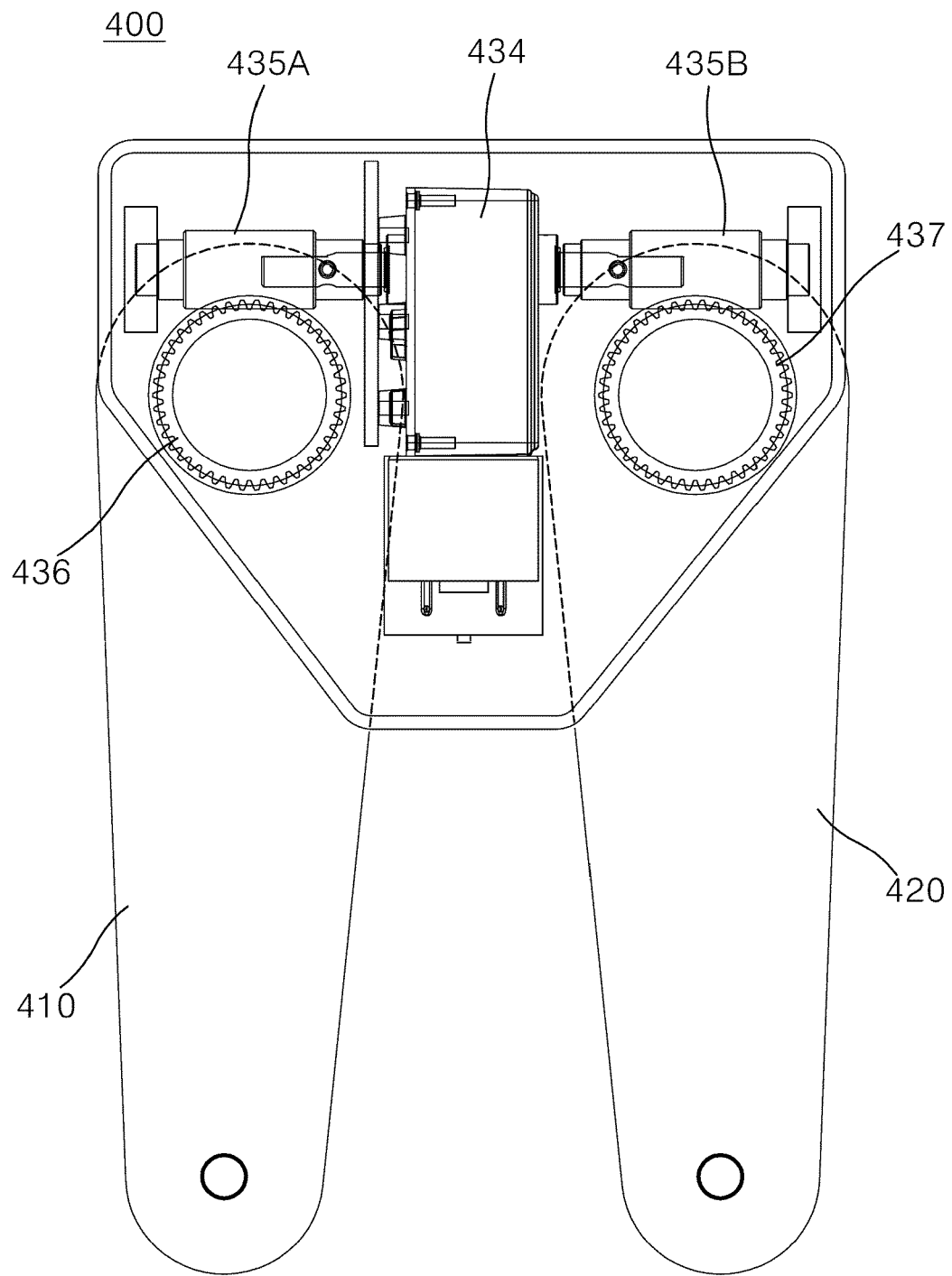
FIG. 12 is a cross-sectional view illustrating a second embodiment of the tilt drive unit illustrated in FIG. 3.

FIG. 12 is a cross-sectional view illustrating a second embodiment of the tilt drive unit illustrated in FIG. 3. In this case, the components having the same function as the above-mentioned components according to the first embodiment are denoted by the same reference numerals, a detailed description thereof will be omitted, and only differences will be described.

Referring to FIG. 12, it can be seen that a tilt drive unit 400 according to the second embodiment is different from the tilt drive unit 40 according to the first embodiment.

That is, in the tilt drive unit 40 according to the first embodiment, the single worm gear 435 is provided between the first worm wheel 436 and the second worm wheel 437 and engages with the first worm wheel 436 and the second worm wheel 437. In contrast, in the tilt drive unit 400 according to the second embodiment, two worm gears 435A and 435B are provided, and the worm gears 435A and 435B include a first worm gear 435A and a second worm gear 435B.

In the tilt drive unit 400 according to the second embodiment, the first worm gear 435A and the second worm gear 435B are installed on the speed reducer 434 and protrude in the opposite directions. In addition, the first worm gear 435A rotates the first worm wheel 436 connected to the first tilt arm 410, and the second worm gear 435B rotates the second worm wheel 437 connected to the second tilt arm 420.

Figure 13:
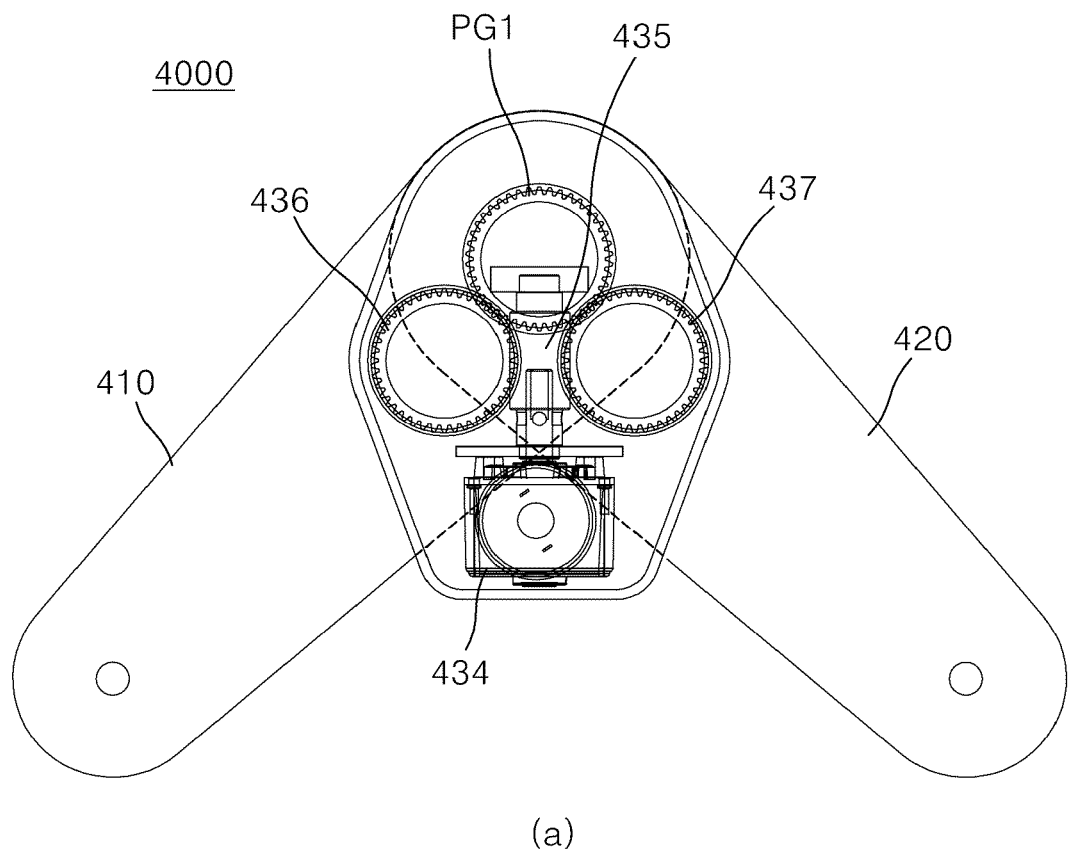
FIG. 13 is a cross-sectional view illustrating a third embodiment of the tilt drive unit illustrated in FIG. 3.
Figure 13:
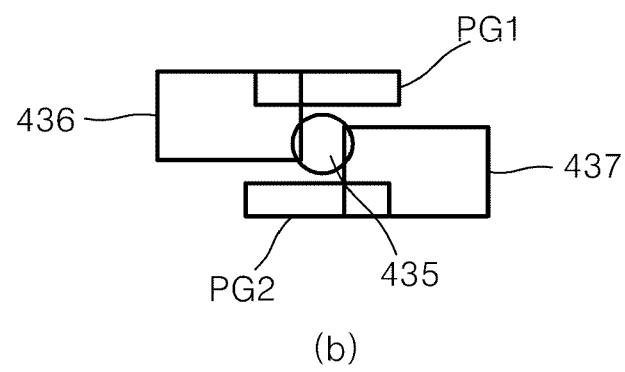

FIG. 13 is a cross-sectional view illustrating a third embodiment of the tilt drive unit illustrated in FIG. 3. In this case, the components having the same function as the above-mentioned components according to the first embodiment are denoted by the same reference numerals, a detailed description thereof will be omitted, and only differences will be described.

Referring to FIG. 13, it can be seen that a tilt drive unit 4000 according to the third embodiment is different from the tilt drive unit 40 according to the first embodiment.

That is, in the tilt drive unit 40 according to the first embodiment, the first worm wheel 436 is connected to the first tilt arm 410 through the rotary shafts 436S1 and 436S2 and rotates the first tilt arm 410, and the second worm wheel 437 is connected to the second tilt arm 420 through the rotary shafts 437S1 and 437S2 and rotates the second tilt arm 420. In contrast, unlike the tilt drive unit 40 according to the first embodiment, the tilt drive unit 4000 according to the third embodiment further includes a first pinion gear PG1 and a second pinion gear PG2, the first pinion gear PG1 is connected to the first tilt arm 410, the second pinion gear PG2 is connected to the second tilt arm 420, the first worm wheel 436 engages with the first pinion gear PG1 and rotates the first tilt arm 410 through the first pinion gear PG1, and the second worm wheel 437 engages with the second pinion gear PG2 and rotates the second tilt arm 420 through the second pinion gear PG2.

Figure 14:
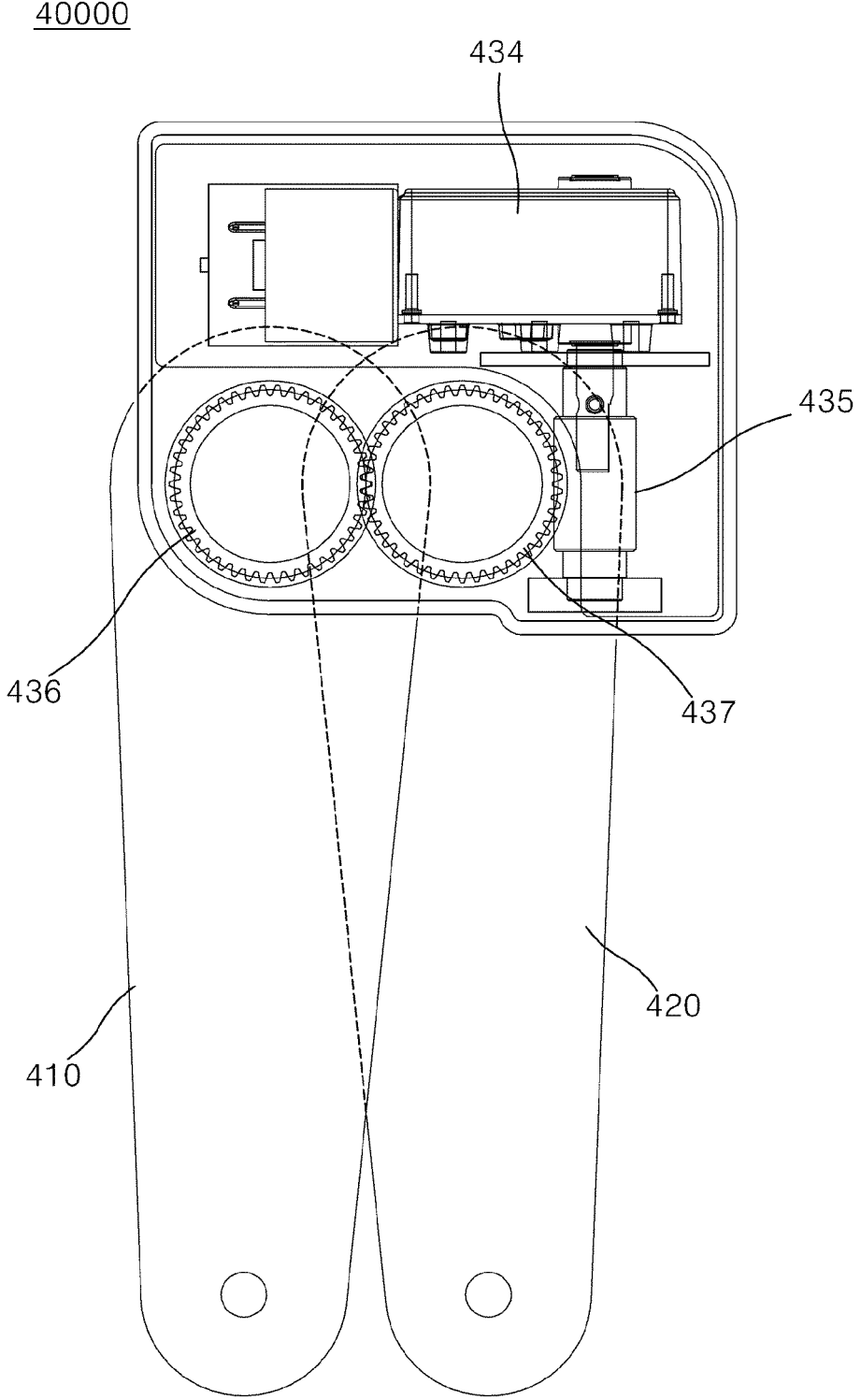
FIG. 14 is a cross-sectional view illustrating a fourth embodiment of the tilt drive unit illustrated in FIG. 3.

FIG. 14 is a cross-sectional view illustrating a fourth embodiment of the tilt drive unit illustrated in FIG. 3. In this case, the components having the same function as the above-mentioned components according to the first embodiment are denoted by the same reference numerals, a detailed description thereof will be omitted, and only differences will be described.

Referring to FIG. 14, it can be seen that a tilt drive unit 40000 according to the fourth embodiment is different from the tilt drive unit 40 according to the first embodiment.

That is, in the tilt drive unit 40 according to the first embodiment, the worm gear 435 is disposed between the first worm wheel 436 and the second worm gear 437 and engages with the first worm wheel 436 and the second worm wheel 437. In contrast, in the tilt drive unit 40000 according to the fourth embodiment, the worm gear 435 is disposed at one side of the second worm wheel 437 and engages with the second worm wheel 437. Of course, the worm gear 435 may be disposed at one side of the first worm wheel 436 and engage with the first worm wheel 436. That is, the worm gear 435 may be disposed at one side of any one of the first worm wheel 436 and the second worm wheel 437 and engage with any one of the worm wheels. In addition, in the tilt drive unit 40000 according to the fourth embodiment, the first worm wheel 436 and the second worm wheel 437 may engage with each other.

Figure 15:
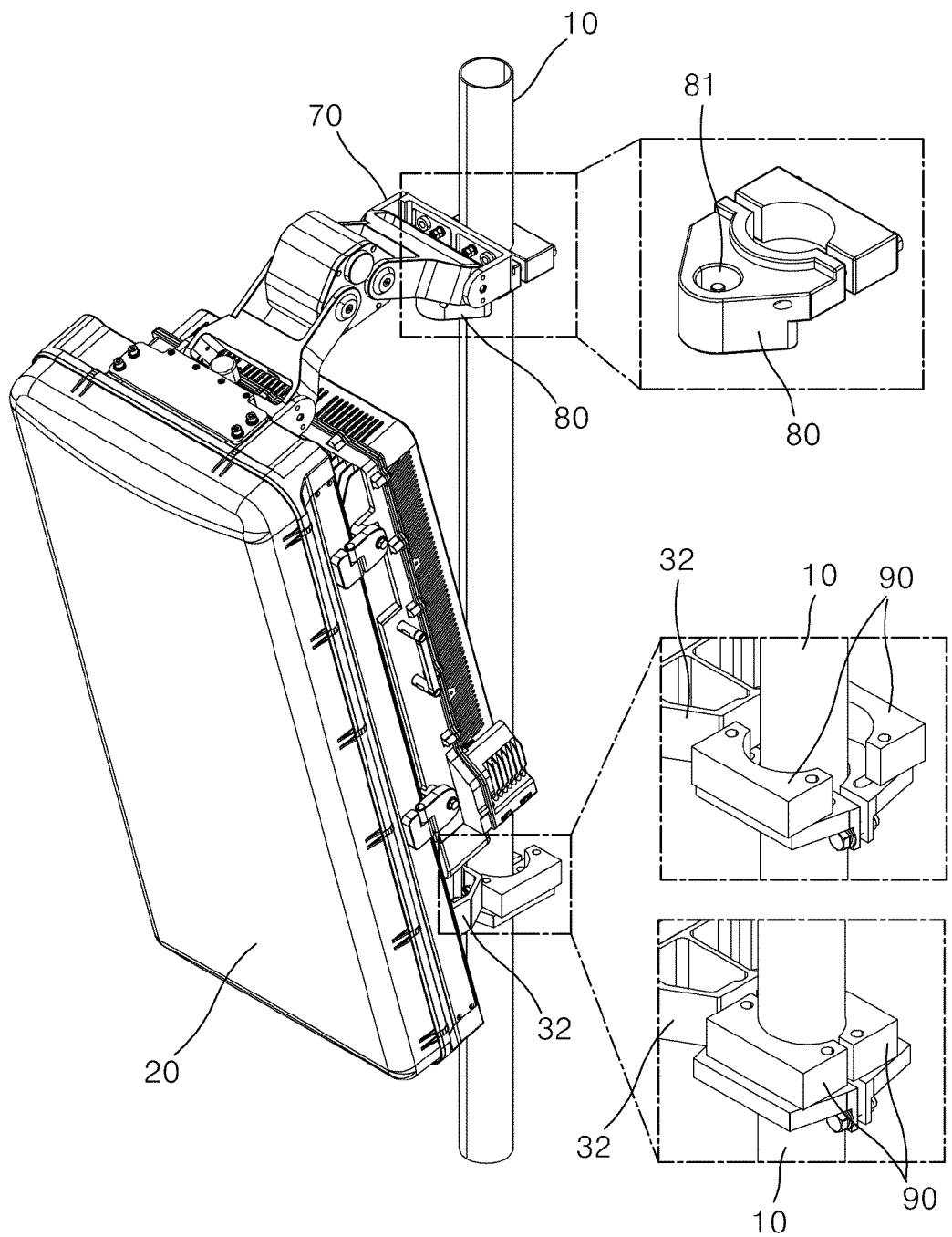
FIG. 15 is a view illustrating an antenna device according to another embodiment of the present invention.

FIG. 15 is a view illustrating an antenna device according to another embodiment of the present invention. In this case, the components identical to the components of the antenna device according to the above-mentioned embodiments are denoted by the same reference numerals, a detailed description thereof will be omitted, and only differences will be described.

Referring to FIG. 15, it can be seen that the antenna device according to another embodiment of the present invention is different from the antenna device according to the above-mentioned embodiment.

That is, in the antenna device according to the above-mentioned embodiment, the antenna unit 20 is only tilted. In contrast, the antenna device according to the present embodiment may rotate the antenna unit 20 in the circumferential direction of the pole 10. To this end, the antenna device according to the present embodiment further includes a steering unit 80 and a clutch unit 90, unlike the antenna device according to the above-mentioned embodiment.

In the present embodiment, the upper mounting clamp 70 is not installed directly on the pole 10, the steering unit 80 is fixedly installed on the pole 10, and the upper mounting clamp 70 is coupled to the steering unit 80 so as to be rotatable in a horizontal direction. The steering unit 80 may rotate the upper mounting clamp 70 in the horizontal direction.

Specifically, the steering unit 80 has a hole 81 into which a vertical shaft formed on the upper mounting clamp 70 is inserted. The vertical shaft may be inserted into the hole 81 and coupled to a shaft formed in the steering unit 80. A motor configured to rotate the vertical shaft may be installed in the steering unit 80.

In addition, in the present embodiment, the lower mounting clamp 32 is fixed to the pole 10 through the clutch unit 90 without being installed directly on the pole 10. The clutch unit 90 may be coupled to the pole 10 and fix the lower mounting clamp 32. When the steering unit 80 rotates the upper mounting clamp 70 in the horizontal direction, the clutch unit 90 may be uncoupled from the pole 10 and rotate in the horizontal direction.

The clutch unit 90 may include two parts that surround the pole 10. When electricity is applied to the clutch unit 90, the two parts are spread, and the lower mounting clamp 32 is loosely coupled to the pole 10, such that the lower mounting clamp 32 is rotatable in the circumferential direction of the pole 10. Of course, when no electricity is applied to the clutch unit 90, the two parts tightly surround the pole 10, such that the lower mounting clamp 32 does not rotate in the circumferential direction of the pole 10.

Therefore, when the clutch unit 90 operates so that the lower mounting clamp 32 is rotatable in the circumferential direction of the pole 10, and then the steering unit 80 rotates the vertical shaft and rotates the upper mounting clamp 70 in the horizontal direction, a position of the antenna unit 20 may be adjusted as the antenna unit 20 rotates in the circumferential direction of the pole 10.

Figure 16:
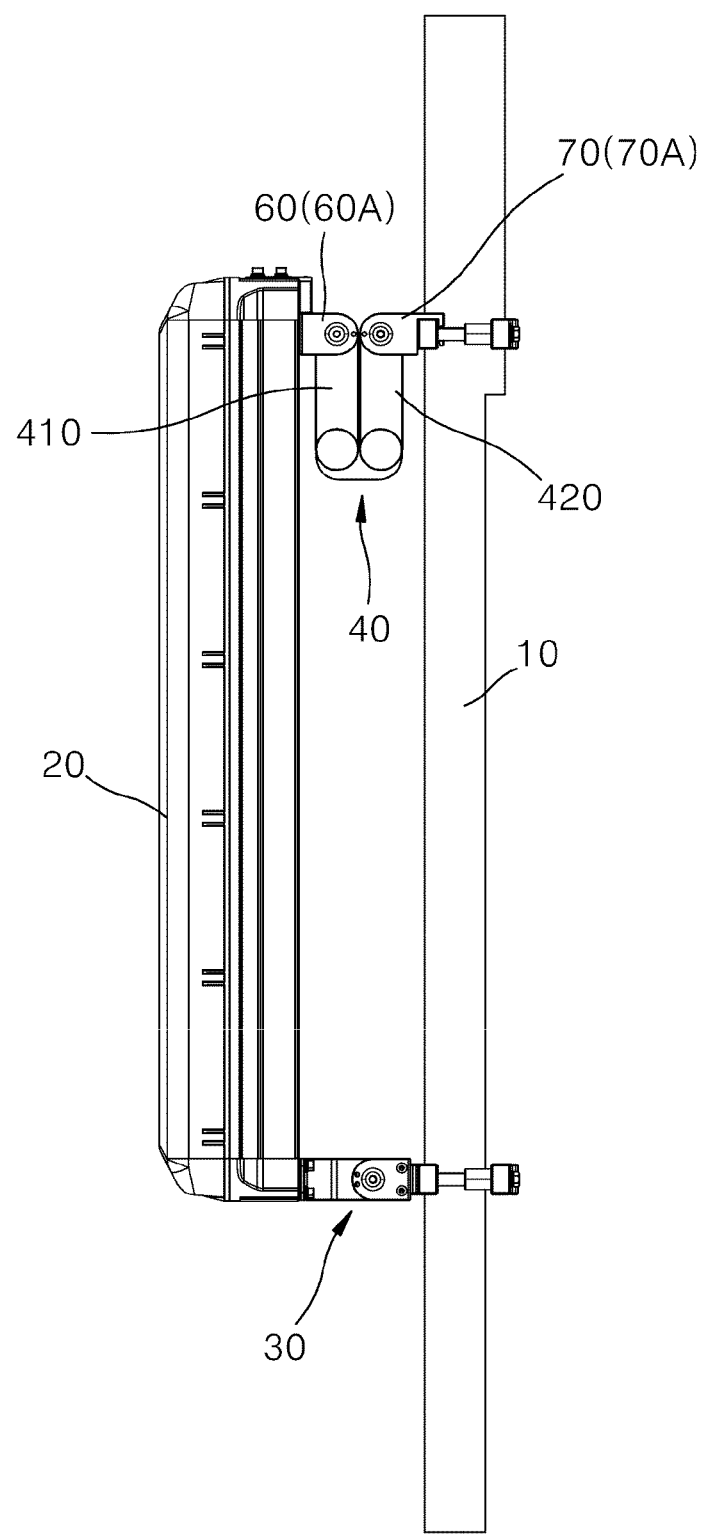
FIG. 16 is a view illustrating an antenna device according to still another embodiment of the present invention.

FIG. 16 is a view illustrating an antenna device according to still another embodiment of the present invention. The components identical to the components according to the embodiment described above with reference to FIGS. 1 to 11 are denoted by the same reference numerals, a detailed description thereof will be omitted, and only differences will be described.

Referring to FIG. 16, it can be seen that the antenna device according to still another embodiment of the present invention is different from the antenna device according to the embodiment described above with reference to FIGS. 1 to 11.

That is, the tilt drive unit 40 of the above-mentioned antenna device is bent downward when the antenna unit 20 is vertically disposed. In contrast, the tilt drive unit 40 of the antenna device according to the present embodiment may be bent upward when the antenna unit 20 is vertically disposed.

That is, in the present embodiment, an upper portion of the first tilt arm 410 may be rotatably coupled to the first coupling portions 60A of the upper mounting bracket 60, and a lower portion of the first tilt arm 410 may be coupled to the rotary shaft of the first worm wheel 436. In addition, in the present embodiment, an upper portion of the second tilt arm 420 may be rotatably coupled to the second coupling portions 70A of the upper mounting clamp 70, and a lower portion of the second tilt arm 420 may be coupled to the rotary shaft of the second worm wheel 437.

Figure 17:
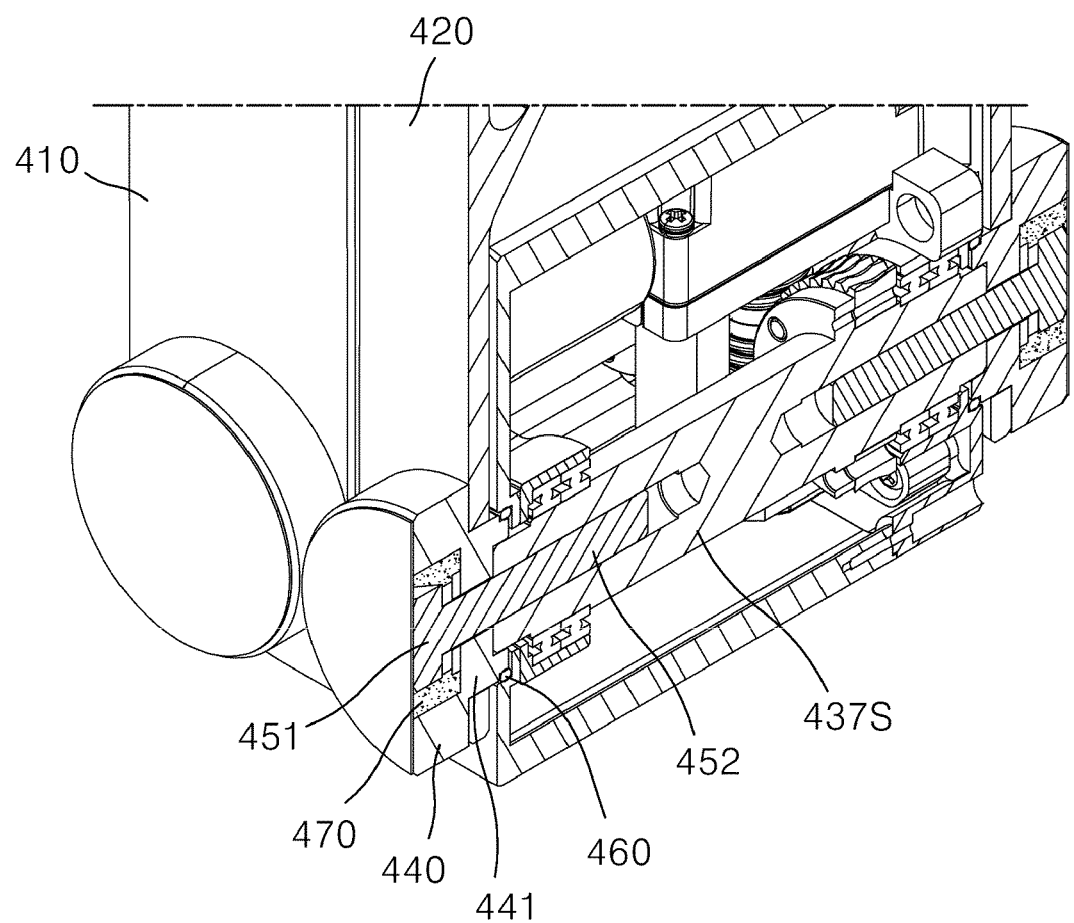
FIG. 17 is a cut-away perspective view illustrating a tilt drive unit illustrated in FIG. 16.
Figure 18:
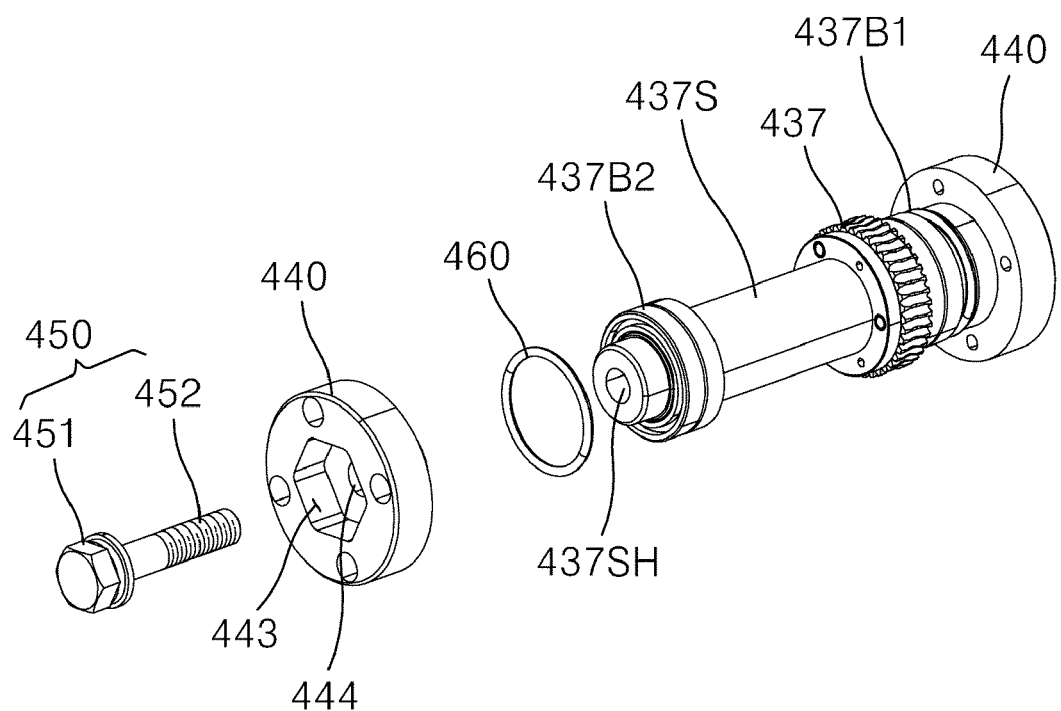
FIG. 18 is an exploded perspective view illustrating one side of a main part of the tilt drive unit illustrated in FIG. 17.
Figure 19:
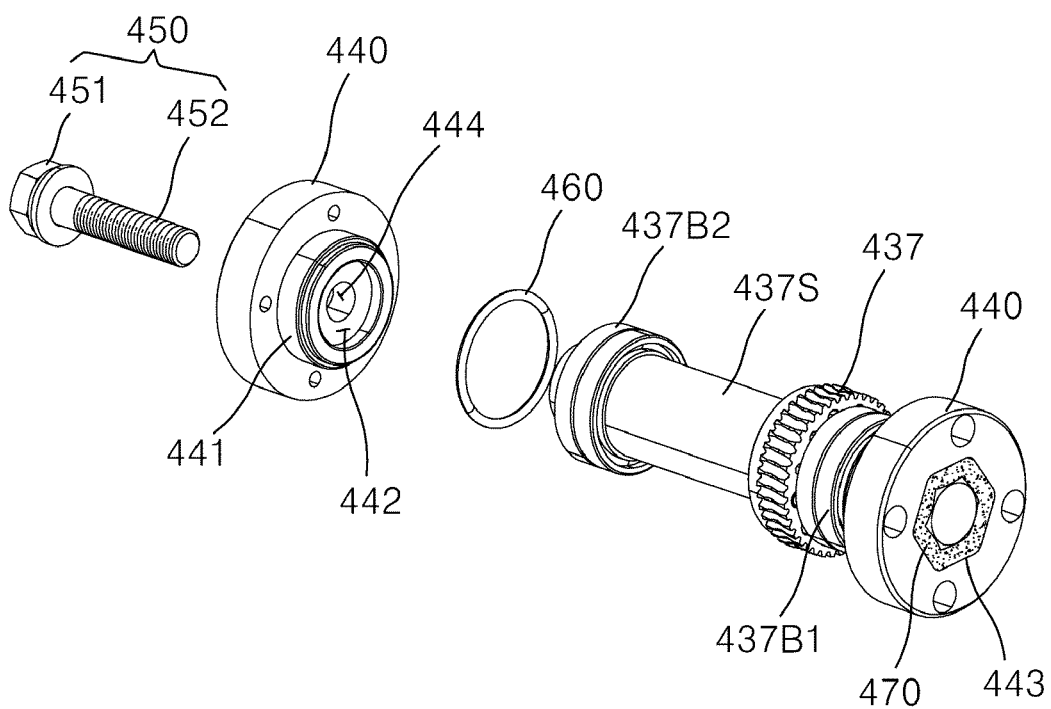
FIG. 19 is an exploded perspective view illustrating the other side of the main part of the tilt drive unit illustrated in FIG. 17.

FIG. 17 is a cut-away perspective view illustrating the tilt drive unit illustrated in FIG. 16, FIG. 18 is an exploded perspective view illustrating one side of a main part of the tilt drive unit illustrated in FIG. 17, and FIG. 19 is an exploded perspective view illustrating the other side of the main part of the tilt drive unit illustrated in FIG. 17.

Referring to FIGS. 17 to 19, in the present embodiment, shaft end caps 440 may be respectively installed at two opposite ends of the rotary shaft 437S of the second worm wheel 437. Of course, the shaft end caps 440 may be provided as a plurality of shaft end caps 440, and the plurality of shaft end caps 440 may be respectively installed even at the two opposite ends of the rotary shaft of the first worm wheel 436. In the present embodiment, a total of four shaft end caps 440 are provided. Two shaft end caps 440 may be installed, one by one, at the two opposite ends of the rotary shaft of the first worm wheel 436, and the remaining two shaft end caps 440 may be installed, one by one, at the two opposite ends of the rotary shaft 437S of the second worm wheel 437.

Because the structures for respectively installing the plurality of shaft end caps 440 at the two opposite ends of the rotary shaft of the first worm wheel 436 and the two opposite ends of the rotary shaft 437S of the second worm wheel 437 are identical to one another. Therefore, FIGS. 17 to 19 only illustrate the structure for installing the two shaft end caps 440 at the two opposite ends of the rotary shaft 437S of the second worm wheel 437.

The plurality of shaft end caps 440 may couple the second tilt arm 420 to the two opposite ends of the rotary shaft 437S of the second worm wheel 437 by means of bolts 450. Of course, the plurality of shaft end caps 440 may couple the first tilt arm 410 to the two opposite ends of the rotary shaft of the first worm wheel 436 by means of bolts.

An insertion portion 441 may protrude from an inner surface of each of the plurality of shaft end caps 440 and be inserted into the tilt drive housing after penetrating the first tilt arm 410 or the second tilt arm 420. The insertion portion 441 may have an insertion groove 442 into which one end of the rotary shaft of the first worm wheel 436 or one end of the rotary shaft 437S of the second worm wheel 437 is inserted.

The plurality of shaft end caps 440 may be fastened to the first tilt arm 410 or the second tilt arm 420 by means of a plurality of screws, and the insertion portion 441 may rotate relative to the tilt drive housing. Therefore, when the rotary shaft of the first worm wheel 436 or the rotary shaft 437S of the second worm wheel 437 rotates, the plurality of shaft end caps 440 may rotate together with the rotary shaft of the first worm wheel 436 or the rotary shaft 437S of the second worm wheel 437, and at the same time, the first tilt arm 410 or the second tilt arm 420 may rotate.

An O-ring 460 may be installed on an outer peripheral surface of the insertion portion 441. The O-ring 460 may be disposed in the tilt drive housing and prevent the insertion portion 441 from being easily withdrawn from the inside of the tilt drive housing to the outside of the tilt drive housing. The O-ring 460 may prevent foreign substances from being introduced into the tilt drive housing from the outside of the tilt drive housing.

In the embodiment described above with reference to FIGS. 1 to 11, the rotary shafts of the first worm wheel 436 include the two rotary shaft portions 436S1 and 436S2, and the rotary shafts of the second worm wheel 437 include the two rotary shaft portions 437S1 and 437S2. In addition, in the embodiment described above with reference to FIGS. 1 to 11, the two rotary shaft portions 436S1 and 436S2 engage with each other by means of the catching protrusion 436P and the catching groove 436F, and the two rotary shaft portions 437S1 and 437S2 engage with each other by means of the catching protrusion 437P and the catching groove 437F. Therefore, in the above-mentioned embodiment, an assembly tolerance may occur in the horizontal direction because it is difficult to finely adjust assembling positions of the rotary shafts of the first worm wheel 436 and the rotary shafts of the second worm wheel 437 in the horizontal direction. The assembly tolerance in the horizontal direction makes it difficult to adjust an operation balance of the first and second tilt arms 410 and 420.

However, in the present embodiment, axial surfaces of two opposite ends of the rotary shaft of the first worm wheel 436 and the axial surfaces of the two opposite ends of the rotary shaft 437S of the second worm wheel 437 may each be formed as a flat surface having no protrusion or groove. An axial surface in the insertion groove 442 may also be formed as a flat surface having no protrusion or groove. Therefore, the two opposite ends of the rotary shaft of the first worm wheel 436 and the two opposite ends of the rotary shaft 437S of the second worm wheel 437 may finely slip in the horizontal direction in the state in which the two opposite ends of the rotary shaft of the first worm wheel 436 and the two opposite ends of the rotary shaft 437S of the second worm wheel 437 are respectively inserted into the insertion grooves 442 of the insertion portions 441 formed on the shaft end caps 440. Therefore, it is possible to reduce the assembly tolerance in the horizontal direction by finely adjusting the assembling positions of the rotary shaft of the first worm wheel 436 and the rotary shaft 437S of the second worm wheel 437 in the horizontal direction.

However, the present embodiment adopts a method of securely fixing the respective bolts 450 in order to reduce a loss of power in respective rotation directions of the rotary shaft of the first worm wheel 436 and the rotary shaft 437S of the second worm wheel 437. That is, bolt head accommodation grooves 443 may be respectively formed in the plurality of shaft end caps 440 and respectively accommodate heads 451 of the bolts 450. The bolt head accommodation grooves 443 may each be filled with a bonding agent 470 that fixes the head 451 of the bolt 450. In the present embodiment, an epoxy bonding agent may be used as the bonding agent 470, but the bonding agent 470 is not limited to the epoxy bonding agent. Examples of the bonding agent 470 may include all bonding agents with which the bolt head accommodation groove 443 is filled and which may fix the head 451 of the bolt 450 so that the head 451 of the bolt 450 is not rotated.

The bolt head accommodation grooves 443 may each be formed in the axial direction in the outer surface of each of the plurality of shaft end caps 440. A threaded portion 452 of the bolt 450 may penetrate a communication hole 444 that is formed in the bolt head accommodation groove 443 and communicates with the insertion groove 442, may be inserted into a hole formed in the axial direction at the end of the rotary shaft of the first worm wheel 436, and may be coupled to the rotary shaft of the first worm wheel 436. Alternatively, the threaded portion 452 of the bolt 450 may be inserted into a hole 437SH formed in the axial direction at the end of the rotary shaft 437S of the second worm wheel 437 and may be coupled to the rotary shaft 437S of the second worm wheel 437.

The bolt head accommodation groove 443 and the head 451 of the bolt 450 may each be formed in a hexagonal shape in order to prevent the bolt 450 from easily rotating. When the bolt head accommodation groove 443 and the head 451 of the bolt 450 are each formed in a hexagonal shape, in the state in which the bolt head accommodation groove 443 is filled with the bonding agent 470 and the head 451 of the bolt 450 is fixed, the head 451 of the bolt 450 may not be easily rotate in comparison with a case in which the bolt head accommodation groove 443 and the head 451 of the bolt 450 are each formed in a circular shape. However, the shapes of the bolt head accommodation groove 443 and the head 451 of the bolt 450 may be a polygonal shape without being limited to the hexagonal shape.

In addition, the threaded portion 452 of the bolt 450 may be fixed to the rotary shaft of the first worm wheel 436 or the rotary shaft 437S of the second worm wheel 437 by means of a screw fixing agent in order to prevent the bolt 450 from rotating further. In this case, the screw fixing agent may be a liquid or semiliquid applied onto the threaded portion 452 of the bolt 450 or a Teflon tape wound around the threaded portion 452 of the bolt 450.

As described above, the antenna device according to the embodiment of the present invention may ensure the installation space for the radio unit 50, which is the component related to the antenna, by tilting the antenna unit 20 and eliminate a dead zone of a signal, which is transmitted or received by the antenna, by changing a direction of the signal that is transmitted or received by the antenna.

In addition, the antenna device according to the embodiment of the present invention may tilt the antenna unit 20 by using the two worm wheels 436 and 437, thereby quickly tilting the antenna unit 20 in comparison with a case in which the antenna unit 20 is tilted by a single worm wheel.

In addition, according to the antenna device according to the embodiment of the present invention, when an external force such as wind is applied to the antenna device from the outside, the external force may be dispersed to the two worm wheels 436 and 437. Therefore, the antenna device may improve structural stability of the gear parts 435, 436, and 437 in comparison with a case in which the antenna unit 20 is tilted by a single worm wheel.

In addition, the antenna device according to the embodiment of the present invention may include the plurality of shaft end caps 440 configured to couple the first tilt arm 410 to the two opposite ends of the rotary shaft of the first worm wheel 436 by means of the bolts and couple the second tilt arm 420 to the two opposite ends of the rotary shaft 437S of the second worm wheel 437 by means of the bolts 450. The plurality of shaft end caps 440 may each have the bolt head accommodation groove 443 that accommodates the head 451 of the bolt 450. The bolt head accommodation groove 443 may be filled with the bonding agent 470 that fixes the head 451 of the bolt 450. Therefore, the antenna device may eliminate the horizontal assembly tolerance between the rotary shaft of the first worm wheel 436 and the rotary shaft 437S of the second worm wheel 437, and then may fix the horizontal assembling positions of the rotary shaft of the first worm wheel 436 of the rotary shaft 437S of the second worm wheel 437 by means of the bonding agent 470 from the outside of the tilt drive unit 40. Therefore, the antenna device may easily adjust the operation balance of the first and second tilt arms 410 and 420.

A person skilled in the art may understand that the present invention may be carried out in other specific forms without changing the technical spirit or the essential characteristics of the present invention. Therefore, it should be understood that the above-described embodiments are illustrative in all aspects and do not limit the present invention. The scope of the present invention is represented by the claims to be described below rather than the detailed description, and it should be interpreted that the meaning and scope of the claims and all the changes or modified forms derived from the equivalent concepts thereto fall within the scope of the present invention.

INDUSTRIAL APPLICABILITY

The present invention provides the antenna device capable of ensuring the installation space for the components related to the antenna and eliminating a dead zone of a signal transmitted or received by the antenna by tilting the antenna unit.

The invention claimed is:
1. An antenna device comprising:
a pole;
an antenna unit;
a lower link unit configured to couple a lower portion of the antenna unit to the pole so that the lower portion of the antenna unit is rotatable in an upward/downward direction; and
a tilt drive unit configured to couple an upper portion of the antenna unit to the pole and tilt the upper portion of the antenna unit by rotating the upper portion of the antenna unit about a rotation center of the lower link unit,
wherein the tilt drive unit comprises:
a tilt motor;
a worm gear configured to be rotated by driving power of the tilt motor;
a first tilt arm coupled to the antenna unit;
a second tilt arm coupled to the pole;
a first worm wheel configured to rotate the first tilt arm by being rotated by a rotation of the worm gear; and
a second worm wheel configured to rotate the second tilt arm by being rotated by a rotation of the worm gear.
2. The antenna device of claim 1, further comprising:
a radio unit coupled to the antenna unit and disposed in an internal space defined by the pole, the antenna unit, the lower link unit, and the tilt drive unit.
3. The antenna device of claim 1, further comprising:
an upper mounting bracket coupled to the upper portion of the antenna unit and having first coupling portions protruding toward the pole; and
an upper mounting clamp coupled to an upper portion of the pole and having second coupling portions protruding toward the antenna unit,
wherein a lower portion of the first tilt arm is rotatably coupled to the first coupling portions, and an upper portion of the first tilt arm is coupled to rotary shafts of the first worm wheel, and
wherein a lower portion of the second tilt arm is rotatably coupled to the second coupling portions, and an upper portion of the second tilt arm is coupled to rotary shafts of the second worm wheel.

4. The antenna device of claim 3, wherein the first coupling portions are provided as a pair of first coupling portions spaced apart from each another in a transverse direction of the antenna unit, and the second coupling portions are provided as a pair of second coupling portions spaced apart from each another in the transverse direction of the antenna unit,
  wherein the first tilt arm comprises:
  a first tilt arm main body having two opposite lower portions rotatably coupled to the pair of first coupling portions;
  a first extension portion extending upward from one side upper end of the first tilt arm main body and coupled to one end of the rotary shaft of the first worm wheel; and
  a second extension portion extending upward from the other side upper end of the second tilt arm main body and coupled to the other end of the rotary shaft of the first worm wheel, and
  wherein the second tilt arm comprises:
  a second tilt arm main body having two opposite lower portions rotatably coupled to the pair of second coupling portions;
  a third extension portion extending upward from one side upper end of the second tilt arm main body and coupled to one end of the rotary shaft of the second worm wheel; and
  a fourth extension portion extending upward from the other side upper end of the second tilt arm main body and coupled to the other end of the rotary shaft of the second worm wheel.

5. The antenna device of claim 4, further comprising:
  tilt drive housings disposed between the first extension portion and the third extension portion and between the second extension portion and the fourth extension portion and configured to accommodate the tilt motor, the worm gear, the first worm wheel, and the second worm wheel therein.

6. The antenna device of claim 4, wherein one of the first extension portion and the second extension portion is separably fastened to the first tilt arm main body, and one of the third extension portion and the fourth extension portion is separably fastened to the second tilt arm main body.

7. The antenna device of claim 6, wherein the rotary shafts of the first worm wheel comprise:
  a first rotary shaft portion having an outer periphery to which the first worm wheel is coupled, the first rotary shaft portion having an outer end fastened to any one of the first extension portion and the second extension portion; and
  a second rotary shaft portion integrated with the other of the first extension portion and the second extension portion and fastened to an inner end of the first rotary shaft portion, and
  wherein the rotary shafts of the second worm wheel comprise:
  a third rotary shaft portion having an outer periphery to which the second worm wheel is coupled, the third rotary shaft portion having an outer end fastened to any one of the third extension portion and the fourth extension portion; and
  a fourth rotary shaft portion integrated with the other of the third extension portion and the fourth extension portion and fastened to an inner end of the third rotary shaft portion.

8. The antenna device of claim 7, wherein a first catching protrusion extending to a center from the outside is formed on any one of a facing surface of the inner end of the first rotary shaft portion and a facing surface of an inner end of the second rotary shaft portion,
  wherein a first catching groove extending to the center from the outside is formed in the other of the facing surface of the inner end of the first rotary shaft portion and the facing surface of the inner end of the second rotary shaft portion, such that the first catching protrusion is inserted into the first catching groove,
  wherein a second catching protrusion extending to the center from the outside is formed on any one of a facing surface of the inner end of the third rotary shaft portion and a facing surface of an inner end of the fourth rotary shaft portion, and
  wherein a second catching groove extending to the center from the outside is formed in the other of the facing surface of the inner end of the third rotary shaft portion and the facing surface of the inner end of the fourth rotary shaft portion, such that the second catching protrusion is inserted into the second catching groove.

9. The antenna device of claim 4, wherein first stoppers respectively protrude from the facing surfaces of the first and second tilt arm main bodies and come into contact with each other when the antenna unit is minimally tilted.

10. The antenna device of claim 5, wherein a second stopper protrudes from the tilt drive housing and comes into contact with at least one of the first extension portion and the second extension portion and at least one of the third extension portion and the fourth extension portion when the antenna unit is maximally tilted.

11. The antenna device of claim 4, wherein internal open spaces are respectively formed in an upper portion of the first tilt arm main body and an upper portion of the second tilt arm main body so that facing sides of the first and second tilt arm main bodies are opened.

12. The antenna device of claim 4, wherein first opening holes are respectively formed in a lower portion of the first tilt arm main body and a lower portion of the second tilt arm main body and formed through from the antenna unit to the pole.

13. The antenna device of claim 12, wherein second opening holes are further respectively formed at a lower side of the first tilt arm main body and a lower side of the second tilt arm main body and communicate with the first opening holes.

14. The antenna device of claim 1, wherein the lower link unit comprises:
  a lower mounting bracket coupled to the lower portion of the antenna unit and having third coupling portions protruding toward the pole;
  a lower mounting clamp coupled to a lower portion of the pole and having fourth coupling portions protruding toward the antenna unit, and
  wherein the third coupling portions and the fourth coupling portions are coupled to one another and configured to be rotatable in an upward/downward direction, and the lower link unit is coupled to be rotatable in the upward/downward direction.

15. The antenna device of claim 14, wherein the third coupling portions are provided as a pair of third coupling portions spaced apart from each other in a transverse direction of the antenna unit, and the fourth coupling portions are provided as a pair of fourth coupling portions spaced apart from each other in the transverse direction of the antenna unit.

16. The antenna device of claim 5, wherein the worm gear is disposed between the first worm wheel and the second worm wheel and adjusts a clearance between the worm gear and the first worm wheel and a clearance between the worm gear and the second worm wheel by rotating in a circumferential direction of the first and second worm wheels.

17. The antenna device of claim 16, further comprising:
a speed reducer accommodated in the tilt drive housing and configured to amplify output torque of the tilt motor and transmit the amplified output torque to the worm gear,
wherein the worm gear protrudes from the speed reducer, the speed reducer is installed in the tilt drive housing and configured to be rotatable in the circumferential direction of the first and second worm wheels, and the worm gear is rotatable in the circumferential direction of the first and second worm wheels.

18. The antenna device of claim 1, further comprising:
an upper mounting bracket coupled to the upper portion of the antenna unit and having first coupling portions protruding toward the pole and coupled to the first tilt arm so as to be rotatable in an upward/downward direction; and
an upper mounting clamp coupled to an upper portion of the pole and having second coupling portions protruding toward the antenna unit and coupled to the second tilt arm so as to be rotatable in the upward/downward direction,
wherein the lower link unit comprises:
a lower mounting bracket coupled to a lower portion of the antenna unit and having third coupling portions protruding toward the pole; and
a lower mounting clamp coupled to a lower portion of the pole and having fourth coupling portions protruding toward the antenna unit and coupled to the third coupling portions so as to be rotatable in the upward/downward direction,
wherein the lower link unit further comprises:
a steering unit coupled to the pole and configured to rotate the upper mounting clamp in a horizontal direction; and
a clutch unit coupled to the pole and configured to fix the lower mounting clamp, and
wherein when the steering unit rotates the upper mounting clamp in the horizontal direction, the clutch unit is decoupled from the pole, and the clutch unit is rotatable in the horizontal direction.

19. The antenna device of claim 1, further comprising:
an upper mounting bracket coupled to the upper portion of the antenna unit and having first coupling portions protruding toward the pole; and
an upper mounting clamp coupled to an upper portion of the pole and having second coupling portions protruding toward the antenna unit,
wherein an upper portion of the first tilt arm is rotatably coupled to the first coupling portions, and a lower portion of the first tilt arm is coupled to the rotary shaft of the first worm wheel, and
wherein an upper portion of the second tilt arm is rotatably coupled to the second coupling portions, and a lower portion of the second tilt arm is coupled to the rotary shaft of the second worm wheel.

20. The antenna device of claim 1, further comprising:
a plurality of shaft end caps configured to couple the first tilt arm to two opposite ends of the rotary shaft of the first worm wheel by means of bolts and couple the second tilt arm to two opposite ends of the rotary shaft of the second worm wheel by means of bolts,
wherein bolt head accommodation grooves are respectively formed in the plurality of shaft end caps and accommodate heads of the bolts, and
wherein the bolt head accommodation grooves are each filled with a bonding agent that fixes the head of the bolt.

21. The antenna device of claim 20, wherein the bolt head accommodation groove and the head of the bolt are each formed in a polygonal shape.

22. The antenna device of claim 20, wherein a threaded portion of the bolt is fixed to the rotary shaft of the first worm wheel or the rotary shaft of the second worm wheel by means of a screw fixing agent.

* * * * *